United States Patent
Palanki et al.

(10) Patent No.: US 8,693,316 B2
(45) Date of Patent: Apr. 8, 2014

(54) ACCESS POINT RESOURCE NEGOTIATION AND ALLOCATION OVER A WIRELESS INTERFACE

(75) Inventors: Ravi Palanki, San Diego, CA (US); Parag A. Agashe, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 12/701,028

(22) Filed: Feb. 5, 2010

(65) Prior Publication Data

US 2010/0202391 A1    Aug. 12, 2010

Related U.S. Application Data

(60) Provisional application No. 61/151,450, filed on Feb. 10, 2009, provisional application No. 61/175,302, filed on May 4, 2009.

(51) Int. Cl.
*H04W 28/02* (2009.01)

(52) U.S. Cl.
USPC ........ 370/225; 370/237; 370/329; 370/395.2; 455/450; 455/509

(58) Field of Classification Search
None
See application file for complete search history.

(56) References Cited

U.S. PATENT DOCUMENTS

| | | | |
|---|---|---|---|
| 6,023,622 A * | 2/2000 | Plaschke et al. | 455/452.2 |
| 7,574,224 B2 | 8/2009 | Lane et al. | |
| 2006/0030299 A1 | 2/2006 | Wandel | |
| 2006/0285481 A1 * | 12/2006 | Lane et al. | 370/208 |
| 2007/0015525 A1 * | 1/2007 | Beming et al. | 455/509 |
| 2007/0189304 A1 * | 8/2007 | Rosa | 370/395.21 |
| 2007/0293260 A1 * | 12/2007 | Xiao et al. | 455/522 |
| 2008/0008212 A1 | 1/2008 | Wang et al. | |
| 2008/0089297 A1 * | 4/2008 | Seo et al. | 370/336 |
| 2008/0130580 A1 | 6/2008 | Chaponniere et al. | |

(Continued)

FOREIGN PATENT DOCUMENTS

| | | |
|---|---|---|
| CN | 101263671 A | 9/2008 |
| JP | 2010518723 A | 5/2010 |
| WO | 2008096383 A1 | 8/2008 |

OTHER PUBLICATIONS

Ericsson: "Efficient support of relays through MBSFN subframes" 3GPP Draft; RI-084357, 3RD Generation Partnership Project (3GPP), Mobile Competence Centre ; 650, Route Des Lucioles ; F-06921 Sophia-Antipolis Cedex ; France, no. Prague, Czech Republic; Nov. 4, 2008, XP050317627 [retrieved on Nov. 4, 2008] chapters 1 , 2.

(Continued)

*Primary Examiner* — Chi Pham
*Assistant Examiner* — Shick Hom
(74) *Attorney, Agent, or Firm* — Kam T. Tam

(57) ABSTRACT

Systems and methodologies are described that facilitate communicating between access points using the same air interface as for serving wireless devices. Access points can communicate with one another over the air interface to exchange interference management messages related to negotiating and/or allocating resources among the access points or other messages. In addition, access points can prepare served wireless devices for time periods where the access points communicate with disparate access points over the air interface to mitigate confusion or radio link failure detection by the served wireless devices.

100 Claims, 16 Drawing Sheets

(56) References Cited

U.S. PATENT DOCUMENTS

| | | | |
|---|---|---|---|
| 2008/0189970 | A1 | 8/2008 | Wang et al. |
| 2008/0225725 | A1 | 9/2008 | Wang et al. |
| 2008/0305805 | A1* | 12/2008 | Mondal et al. ............... 455/446 |
| 2009/0022235 | A1 | 1/2009 | Zhang et al. |
| 2010/0015525 | A1 | 1/2010 | Isono |
| 2010/0105406 | A1* | 4/2010 | Luo et al. ................. 455/452.2 |
| 2010/0202431 | A1* | 8/2010 | Kazmi et al. .................. 370/342 |
| 2010/0290435 | A1* | 11/2010 | Kazmi ........................... 370/332 |
| 2010/0322191 | A1* | 12/2010 | Lefebvre ....................... 370/331 |
| 2011/0199934 | A1* | 8/2011 | Olofsson et al. ............. 370/252 |
| 2011/0223923 | A1* | 9/2011 | Cho et al. ..................... 455/448 |

OTHER PUBLICATIONS

International Search Report & Written Opinion—PCT/US2010/023678,, International Search Authority—European Patent Office—Apr. 20, 2010.

LG Electronics: "Consideration on Resource Allocation for Relay Backhaul Link" 3GPP Draft; RI-090222, 3RD Generation Partnership Project (3GPP), Mobile Competence Centre ; 650, Route Des Lucioles ; F-06921 Sophia-Antipolis Cedex ; France, no. Ljubljana; Jan. 8, 2009, XP050318152 [retrieved on Jan. 8, 2009] chapters 1 , 2.

Nortel: "On Schemes for Self Backhauling" 3GPP Draft; R1-084473(Nortel-Selfbackhauling), 3RD Generation Partnership Project (3GPP), Mobile Competence Centre ; 650, Route Des Lucioles ; F-06921 Sophia-Antipolis Cedex ; France, no. Prague, Czech Republic; Nov. 5, 2008, XP050317727 [retrieved on Nov. 5, 2008] chapters 1-3.

Panasonic: "Discussion on the TD relay and FD relay for FDD system" 3GPP Draft; RI-084232, 3RD Generation Partnership (3GPP), Mobile Competence Centre ; 650, Route Des Lucioles ; F-06921 Sophia-Antipolis Cedex ; France, no. Prague, Czech Republic; Nov. 4, 2008, XP050317518 [retrieved on Nov. 4, 2008] chapter 2.

Qualcomm Europe: "Introduction of blank subframe indication into SIB2" 3GPP Draft; R2-086823, 3RD Generation Partnership Project (3GPP), Mobile Competence Centre ; 650, Route Des Lucioles ; F-06921 Sophia-Antipolis Cedex ; France, no. Prague, Czech Republic; Nov. 13, 2008, XP050321632 [retrieved on Nov. 13, 2008] chapter 2 annex TP to 36.331.

Research in Motion et al: "L2 Relay Interference Mitigation" 3GPP Draft; RI-090026, 3RD Generation Partnership Project (3GPP), Mobile Competence Centre ; 650, Route Des Lucioles ; F-06921 Sophia-Antipolis Cedex ; France, no. Ljubljana; Jan. 8, 2009, XP050317974 [retrieved on Jan. 8, 2009] chapters 1, 2.

Research in Motion et al: "Relay Control Signalling Resource Coordination" 3GPP Draft; RI-090027, 3RD Generation Partnership Project (3GPP); Mobile Competence Centre ; 650, Route Des Lucioles ; F-06921 Sophia-Antipolis Cedex ; France, no. Ljubljana; Jan. 8, 2009, XP050317975 [retrieved on Jan. 8, 2009] chapters 1,2.

"Inter eNB Over-the-Air Communication (OTAC) for LTE-Advanced," 3GPP TSG RAN WG1 #57 Meeting, San Francisco, USA, May 4-8, 2009, R1-09177.

Garces R, at al, "Collision avoidance and resolution multiple access for multichannel wireless networks"INFOCOM 2000. Nineteenth Annual Joint Conference of the IEEE Computer and Communications Societies. Proceedings. IEEE Tel Aviv, Israel March 26-30, 2000, Piscataway, NJ, USAJEEE, US, vol. 2, Mar. 26, 2000, pp. 595-602, XP010376148ISBN: 976-0-7803-5880-5.

Taiwan Search Report—TW099103845—TIPO—May 21, 2013.

* cited by examiner

ACCESS POINT RESOURCE NEGOTIATION AND ALLOCATION OVER A WIRELESS INTERFACE

CLAIM OF PRIORITY UNDER 35 U.S.C. §119

The present application for patent claims priority to Provisional Application No. 61/151,450 entitled "METHOD AND APPARATUS FOR RESOURCE NEGOTIATION AND ALLOCATION USING A WIRELESS X2 INTERFACE" filed Feb. 10, 2009, and assigned to the assignee hereof and hereby expressly incorporated by reference herein, and Provisional Application No. 61/175,302 entitled "METHOD AND APPARATUS FOR RESOURCE NEGOTIATION AND ALLOCATION USING A WIRELESS X2 INTERFACE" filed May 4, 2009, and assigned to the assignee hereof and hereby expressly incorporated by reference herein.

BACKGROUND

1. Field

The following description relates generally to wireless communications, and more particularly to communications between access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In this regard, access points can communicate with a core network to facilitate providing wireless network access to the mobile devices. In addition, access points can typically communicate with one another over a wired backhaul link (e.g., using an X2 or similar interface, in LTE) through the core network. Femto cell, pico cell, and similar smaller powered access points have been introduced that can connect to the core network via a broadband connection with a disparate network, such as the Internet, and communicate with mobile devices to provide wireless network access on a smaller scale. These access points can also communicate with one another and/or with other access points over the backhaul connection. Inclusion of such access points allows for heterogeneous unplanned network deployments, which can result in interference to one or more access points, access points lacking a reliable interface (e.g., an operator deployed backhaul) for communicating with other access points, and/or the like.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating communicating between access points in a wireless network over an air interface. For example, an access point can communicate with a disparate access point over an air interface that is also utilized by the access points to serve one or more wireless devices. In one example, the access point can communicate with the disparate access point using a co-located wireless device, or a portion thereof, to mitigate modification of the disparate access point. For example, the access points can communicate interference management messages, neighbor lists, or other critical data using the air interface (e.g., alone or in tandem with a wired backhaul link). Moreover, the access point can mitigate potential impact to one or more wireless devices served over the air interface caused by communicating with the disparate access point over the air interface. Thus, access points can communicate in a wireless network even where a respective wired backhaul link becomes unreliable.

According to related aspects, a method is provided that includes communicating with one or more UEs over an air interface and communicating with one or more eNBs over the air interface.

Another aspect relates to a wireless communications apparatus. The wireless communications apparatus can include at least one processor configured to transmit one or more data signals to one or more UEs over an air interface and communicate with one or more eNBs over the air interface. The wireless communications apparatus also comprises a memory coupled to the at least one processor.

Yet another aspect relates to an apparatus. The apparatus includes means for generating a message for one or more eNBs and means for communicating the message to the one or more eNBs over an air interface and communicating one or more disparate messages to one or more UEs over the air interface.

Still another aspect relates to a computer program product, which can have a computer-readable medium including code for causing at least one computer to transmit one or more data signals to one or more UEs over an air interface. The computer-readable medium can also comprise code for causing the at least one computer to communicate a message with one or more eNBs over the air interface.

Moreover, an additional aspect relates to an apparatus including an inter-access point message generating component that creates a message for one or more eNBs. The apparatus can further include an air interface communicating component that communicates the message to the one or more eNBs over an air interface and communicates one or more disparate messages to one or more UEs over the air interface.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
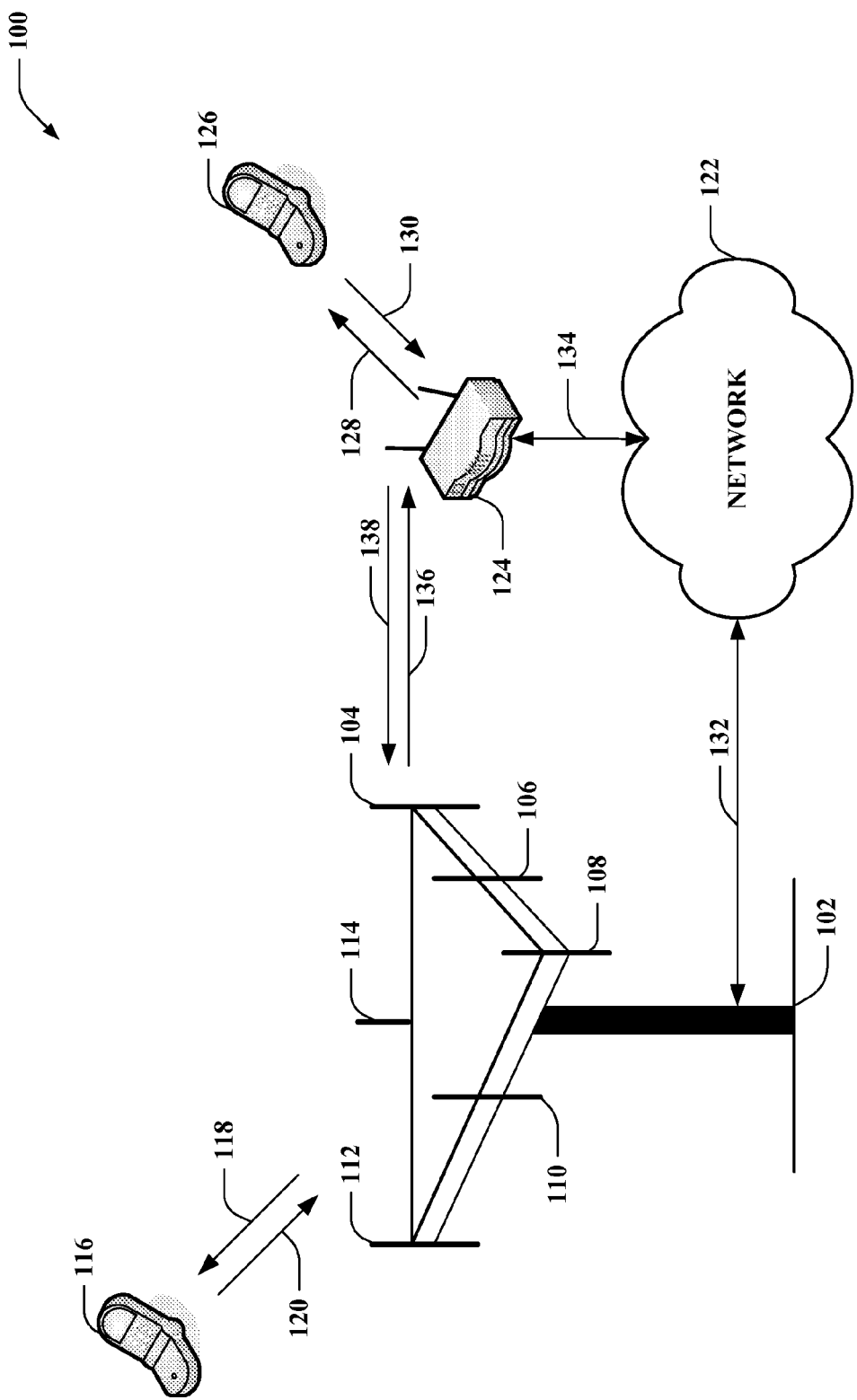
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B (e.g., evolved Node B (eNB), and/or the like), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., an LTE or similar network), over a backhaul link connection 132. The network 122 can store information regarding access parameters related to the mobile device 116 and 126 and other parameters of a wireless access network to provide service to the mobile devices 116 and 126. Furthermore, a femto cell access point 124 can be provided to facilitate communicating with the mobile device 126 over forward link 128 and reverse link 130 (similarly to forward link 118 and reverse link 120, as described supra). The femto cell access point 124 can provide access to one or more mobile devices 126 much like the base station 102, but on a smaller scale. In one example, femto cell access point 124 can be configured in a residence, business, and/or other close range setting (e.g., theme park, stadium, apartment complex, etc.). The femto cell access point 124 can connect to the network 122 utilizing a backhaul link connection 134, which can be over or include in part a broadband Internet connection (T1/T3, digital subscriber line (DSL), cable, etc.), in one example. The network 122 can similarly provide access information for the mobile device 126.

According to an example, mobile devices 116 and 126 can travel over service areas initiating wireless access or performing cell reselection among disparate base stations and/or femto cells during travel or while stationary. In this regard, the mobile devices 116 and 126 can effectuate continuous wireless network access seamless to users of the mobile devices 116 and 126. In one example (not shown), mobile device 126 can have been communicating with the base station 102 similarly to the mobile device 116, and can have moved into a specified range of the femto cell access point 124. In this regard, the mobile device 126 can have reselected one or more cells related to the femto cell access point 124 to receive more desirable wireless network access. In addition, where mobile device 126 moves toward base station 102, it can reselect a cell related thereto, at some point, for a variety of reasons (e.g., to mitigate interference on the femto cell access point 124, to receive a more optimal signal or increased throughput, etc.).

In traveling over the service area, a given mobile device 116 and/or 126 can measure signal quality of available base stations (such as base station 102), femto cells (such as femto cell access point 124), and/or other access points, for example, to determine when cell reselection is suitable to the mobile device 116 and/or 126. In another example, mobile devices 116 and/or 126 can send measurement reports related to disparate cells to their respective access points, base station 102 and femto cell access point 124, for determining when to reselect a disparate cell. Such determinations can be made according to one or more parameters in the measurement report. In one example, the measurement reports can rank access points for reselection (e.g., based on signal-to-noise ratio (SNR) or similar metrics). Based on the ranking, for example, base station 102 can initiate reselection for the mobile devices 116 and/or 126 with the highest ranking access point. In an example, however, femto cell access point 124 can be a closed subscriber group (CSG) access point, to which mobile device 116 and/or 126 may or may not be allowed access, and base station 102 can avoid the femto cell access point 124 (and/or mobile devices 116 and/or 126 can determine not to include femto cell access point 124 in the neighbor list) in cell reselection.

According to an example, base station 102 and femto cell access point 124 can communicate with each other over network 122 using respective backhaul links 132 and 134. For instance, base station 102 and femto cell access point 124 can exchange interference management messages to mitigate interference that can be caused in heterogeneous deployments. In another example, base station 102 and femto cell access point 124 can coordinate or update neighbor lists by communicating over the network 122, can communicate context information for mobile devices 116 and/or 126 to facilitate cell reselection, can communicate coordinates for mobile device 116 and/or 126 triangulation or other location determinations, etc. In one example, however, base station 102 and femto cell access point 124 are not able to communicate over network 122. This can be due to an unreliable backhaul link 132 or 134, absence of backhaul link 132 or 134, failure in the network 122 or connection thereto, and/or the like.

In this example, or even where backhaul links 132 and 134 are operational, base station 102 and femto cell access point 124 can communicate over an air interface utilized to communicate with mobile devices 116 and/or 126. Thus, for example, base station 102 can communicate with femto cell access point 124 over a forward link 136 and receive information therefrom over a reverse link 138. Alternatively, depending on whether base station 102 or femto cell access point 124 is considered the access point or device for purposes of the air interface communication, femto cell access point 124 can communicate with base station 102 over a forward link 138 and receive communications therefrom over a reverse link 136. Thus, for example, where base station 102 communicates with mobile device 116 over an LTE air interface and femto cell access point 124 communicates with mobile device 126 over an LTE air interface, base station 102 and femto cell access point 124 can communicate with one another over the LTE interface, in an example. Moreover, it is to be appreciated that base station 102 and femto cell access point 124 can utilize the air interface for certain communications while continuing to use backhaul links 132 and 134, if operable, for other communications. In one example, the air interface or backhaul link can each either be a primary or secondary line of communication among base station 102 and femto cell access point 124, a redundant line of communication, and/or the like.

Figure 2:
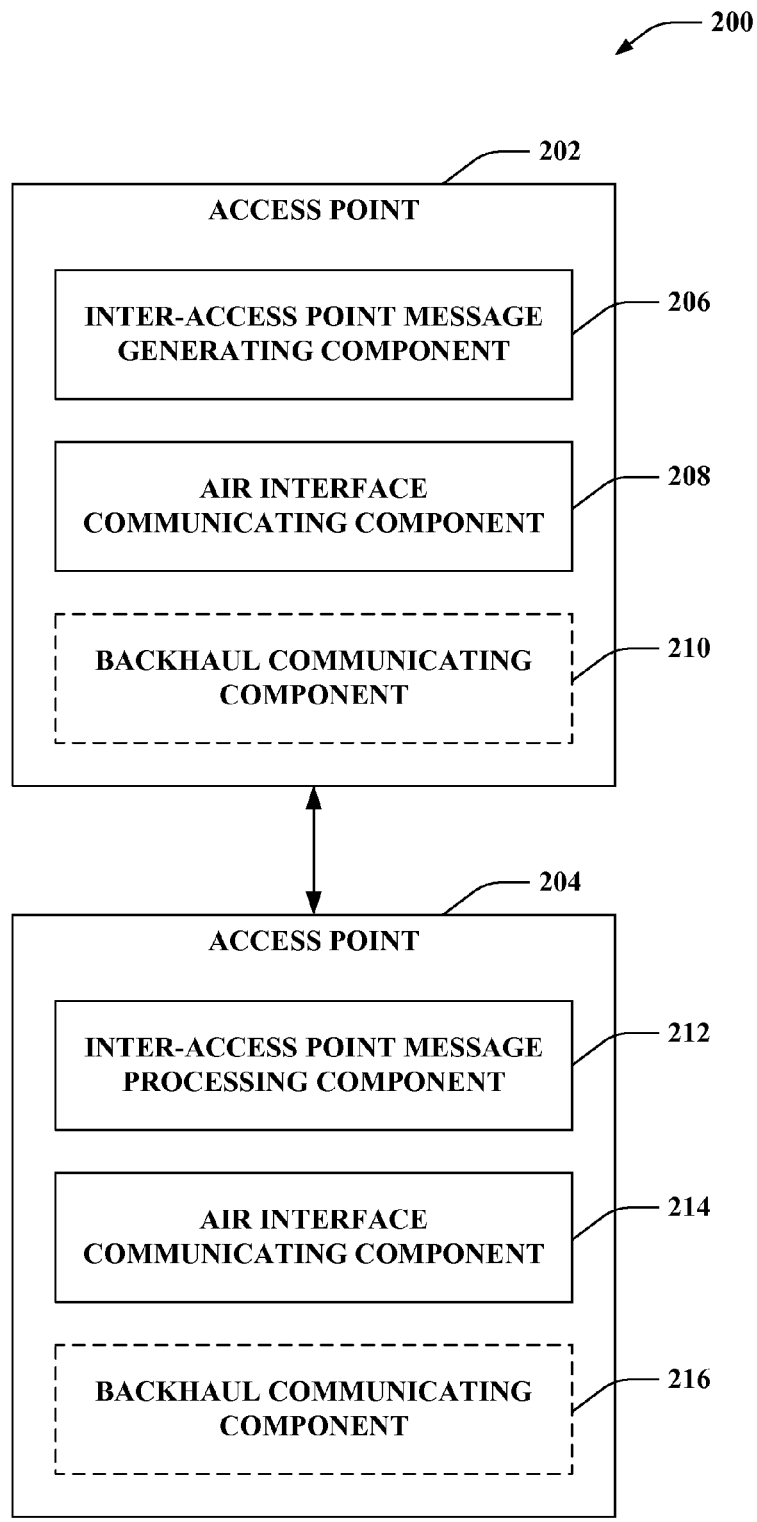
FIG. 2 is an illustration of an example wireless communications system that facilitates inter-access point communication over an air interface.

Turning to FIG. 2, illustrated is a wireless communication system 200 that facilitates communicating among access points over an air interface. System 200 includes access points 202 and 204, which can be macro cell, femto cell, or pico cell access points, base stations, or eNBs, for example, a mobile device, or portions thereof, or substantially any devices that provide one or more wireless devices with access to a wireless network. In addition, access points 202 and 204 can be of a similar or disparate type and can communicate with each other to improve provided network access, for example. Moreover, system 200 can be a MIMO system and/or can conform to one or more wireless network system specifications (e.g., EV-DO, 3GPP, 3GPP2, 3GPP LTE, WiMAX, etc.) and can comprise additional components to facilitate communication between access points 202 and 204. In addition, for example, access point 202 can include components of access point 204 and/or vice versa to provide similar functionality to each other and/or other access points.

Access point 202 includes an inter-access point message generating component 206 that creates one or more messages for communicating to a disparate access point in a wireless network, an air interface communicating component 208 that communicates with the disparate access point and/or one or more wireless devices over an air interface, and an optional backhaul communicating component 210 that can communicate with the disparate access point over a wired backhaul link. Access point 204 includes an inter-access point message processing component 212 that analyzes one or more messages received from a disparate access point, an air interface communicating component 214 that communicates with the disparate access point and/or one or more wireless devices over an air interface, and an optional backhaul communicating component 216 that can communicate with the disparate access point over a wired backhaul link.

According to an example, inter-access point message generating component 206 can create an inter-access point message for communicating to access point 204. The inter-access point message, for example, can be an interference management message, information relating to a neighbor list (e.g., a list of neighboring access points and/or one or more identifiers or other communication parameters related thereto), context information related to a wireless device for cell reselection, information for locating a wireless device using triangulation or other positioning algorithms, and/or the like. Interference management messages can be substantially any message that relates to avoiding communicating over one or more resources, such as a request for blanking transmission power (e.g., which can include a set of related resources), a set of resources over which transmission power is blanked, a resource allocation or related request, and/or the like. For example, blanking transmission power for a set of resources can refer to cancelling or otherwise avoiding transmissions over frequencies and/or time periods related to the set of resources. In another example, the access points 202 and 204 can exchange interference management messages according to a distributed resource allocation scheme to apportion available communication resources among access points 202 and 204 (and/or other access points if present).

Air interface communicating component 208 can transmit the inter-access point message to access point 204 over an air interface. As described, the air interface can be additionally utilized to provide wireless network access to one or more wireless devices. Air interface communicating component 214 can receive the inter-access point message over the air interface. In one example, access point 204 can have previously assigned resources to access point 202 for communicating the inter-access point message over the air interface, much like it can grant resources to one or more wireless devices. In another example, access point 202 can broadcast a message over air interface communicating component 208, and access point 204 can receive the broadcast message over air interface communicating component 214. Inter-access point message processing component 212 can analyze the message and perform an action based on the message. Air interface communicating components 208 and 214, for example, can continue exchanging one or more interference management messages in this regard.

In an example, inter-access point message generating component 206 can create an interference management message to request blanking over a set of resources to allow access point 202 to communicate with one or more wireless devices (not shown) without substantial interference from access point 204. Air interface communicating component 208 can transmit the interference management message to access point 204 over the air interface it utilizes to communicate with served wireless devices (not shown). Air interface communicating component 214 can receive the interference management message over the air interface it utilizes to serve wireless devices. Inter-access point message processing component 212 can determine the blanking request in the interference management message. Access point 204 and/or air interface communicating component 214 can accordingly blank a set of resources for access point 202, and/or can provide a notification of the set of resources to access point 202 using air interface communicating component 216.

In another example, where access point 204 utilizes a set of resources for communicating with a wireless device that overlap those in the interference management message, air interface communicating component 214 can transmit a notification to access point 202 of the resources it utilizes to communicate with one or more wireless devices. Access point 202 can accordingly select a different set of resources, for example, and can send another interference management message. In another example, access point 204 can send a set of resources that access point 202 can utilize. In yet another example, access point 202 can generically request a set of resources from access point 204, and access point 204 can select the set of resources, blank transmission over the set of resources, and notify access point 202 of the blanked set of resources, as described further herein. It is to be appreciated, as described, that access points 202 and 204 can also communicate over a wired backhaul link respectively using backhaul communicating component 210 and backhaul communicating component 216, in one example.

In another example, access point 204 can relay messages between disparate access points. For example, inter-access point message generating component 206 can create a message for a disparate access point (not shown) that also communicates with access point 204, and air interface communicating component 208 can transmit the message to access point 204. Air interface communicating component 214 can receive the message, and inter-access point message processing component 212 can determine the message is for the disparate access point (e.g., based on an identifier in the message). Air interface communicating component 214 can thus forward the communication to the disparate access point (and/or one or more access points that is in a communications path to the disparate access point) over the air interface. Similarly, access point 204 can receive messages for access point 202 from disparate access points over air interface communicating component 214, which can forward the messages to access point 202. Thus, the air interface can be additionally utilized to communicate with various access points may not be in-range.

Figure 3:
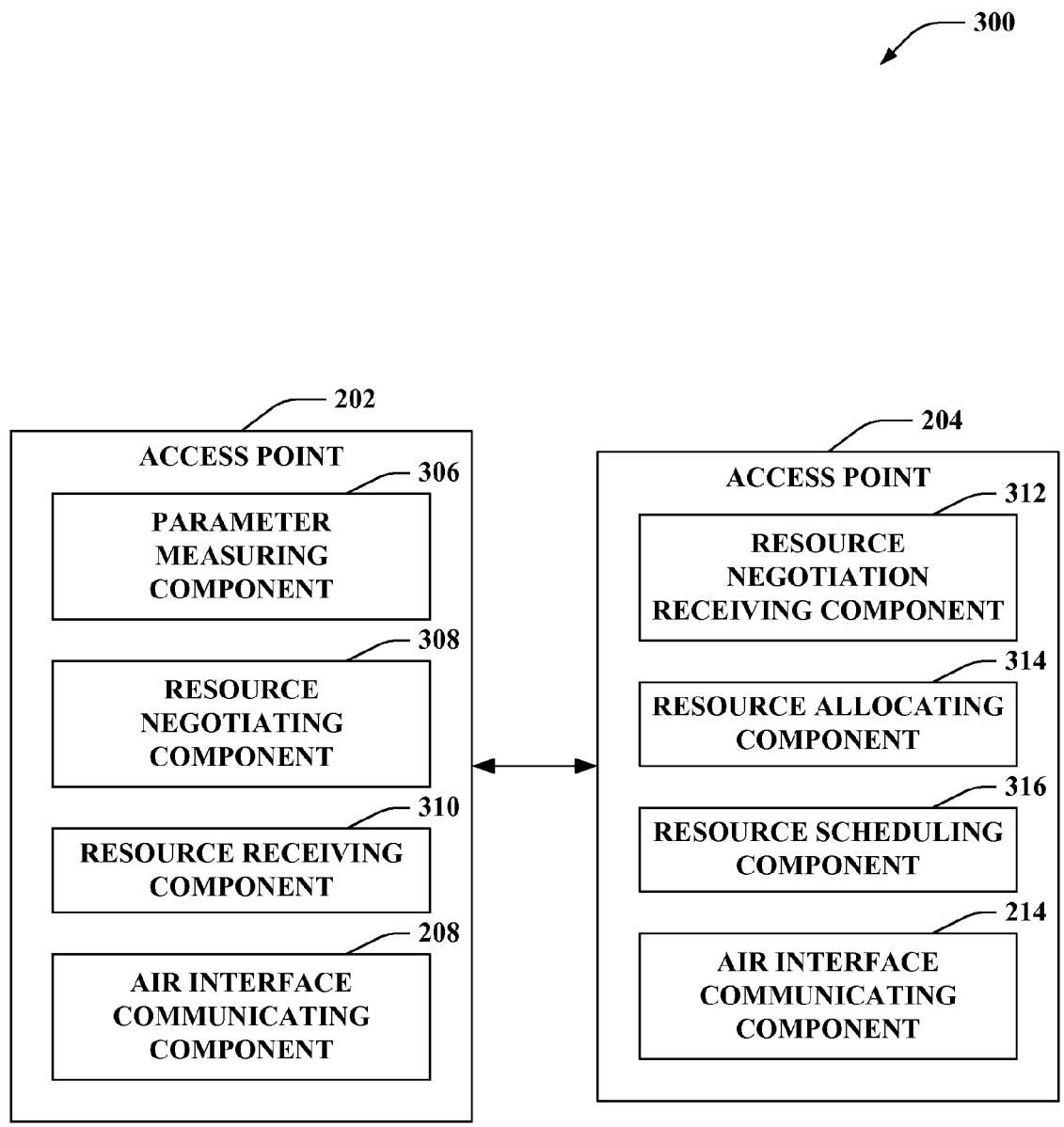
FIG. 3 is an illustration of an example wireless communications system that effectuates negotiating resources between access points over an air interface.

Referring to FIG. 3, an example wireless communication system 300 is illustrated that facilitates partitioning resources among access points. System 300 includes access points 202 and 204, which can be macro cell, femto cell, or pico cell access points, base stations, or other eNBs, for example, mobile devices, or portions thereof, or substantially any devices that provide one or more wireless devices with access to a wireless network, as described. In addition, access points 202 and 204 can be of a similar or disparate type and can communicate with each other to improve provided network access, for example. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communication between access points 202 and 204. In addition, for example, access point 202 can include components of access point 204 and/or vice versa to provide similar functionality to other access points.

Access point 202 includes a parameter measuring component 306 that receives or otherwise determines one or more parameters related to communicating in a wireless network, a resource negotiating component 308 that provides the one or more parameters to a disparate access point for negotiating resources therewith, a resource receiving component 310 that obtains a set of resources from the disparate access point for communicating with one or more wireless devices (not shown), and an air interface communicating component 208 that facilitates such communicating with the disparate access point and the one or more wireless devices.

Access point 204 includes a resource negotiation receiving component 312 that obtains one or more parameters related to requesting a resource allocation from a disparate access point, a resource allocating component 314 that determines a set of resources or one or more parameters regarding a set of resources for providing to the disparate access point based on the one or more parameters, a resource scheduling component 316 that schedules an actual set of resources for the disparate access points and provides a related indication thereto, and an air interface communicating component 214 that facilitates such communicating with the disparate access point (and/or with one or more wireless devices).

According to an example, access point 202 can determine that access point 204 actually or potentially interferes communications between access point 202 and/or one or more wireless devices. For instance, access point 202 can receive signals from access point 204 over the air interface, receive information from one or more wireless devices regarding in-range access points, such as access point 204, receive information from a core network regarding location of the access point 204 relative to access point 202, receive one or more messages from access point 204 over a wired backhaul link, and/or the like to determine that access point 204 potentially interferes with access point 202 communications.

In one example, access point 202 can be a femto cell operating in a coverage area served by access point 204, which can be a macro cell, or vice versa. In another example, both access point 202 and 204 can be femto cell access points that are situated such that they can cause interference to one another. As described, access points 202 and 204 can communicate with each other over respective air interface communicating components 208 and 214, which can be the same air interfaces utilized to communicate with wireless devices to provide wireless network access thereto. Where access point 202 determines potential interference from access point 204 or vice versa, access points 202 and 204 can communicate to establish a distributed resource allocation for respectively communicating with one or more wireless device without interfering one another.

In an example, parameter measuring component 306 can determine one or more parameters regarding communicating in a wireless network. For example, parameter measuring component 306 can retrieve one or more buffer levels related to communicating with one or more wireless devices at access point 202, a type of communication with the one or more wireless devices (e.g., voice, data, media streaming, etc.), a communications load or other traffic-related parameters at the access point 202, an assigned priority of access point 202 as compared to one or more disparate access points in a wireless network, a desired or required resource allocation size, an explicit resource allocation, and/or the like. In this example, resource negotiating component 308 can provide the one or more parameters to access point 204 using the air interface communicating component 208 in a request for resource allocation.

Resource negotiation receiving component 312 can obtain the request for resource allocation from access point 202 and can obtain one or more parameters in the request. Resource allocating component 314 can determine a potential resource allocation for access point 202 to facilitate communicating with its connected wireless devices based at least in part on the one or more parameters. For example, where the one or more parameters includes buffer levels related to communicating with one or more wireless devices, resource allocating component 314 can discern a resource requirement for access point 202 to effectively communicate with the one or more wireless devices. For example, a high buffer level and/or certain types of communications with the one or more wireless devices can indicate that access point 202 requires a large resource allocation to communicate data to the one or more wireless devices, and resource allocating component 314 can accordingly apportion a number of resources to access point 202 for communicating with the one or more wireless devices.

Where the one or more parameters received at resource negotiation receiving component 312 include a communications load at the access point 202, resource allocating component 314 can apportion a greater number of resources for larger communications loads. Where the one or more parameters received at resource negotiation receiving component 312 in the resource allocation request relate to a priority of access point 202, resource allocating component 314 can determine the resource allocation based on the priority of access point 202 as compared to access point 204 and/or one or more additional access points. Thus, for instance, where access point 202 is of a higher priority that access point 204, resource allocating component 314 can generate a resource allocation for access point 202 that includes more resources than left for access point 204. Where the one or more parameters relate to an explicit bandwidth request from access point 202, resource allocating component 314 can select a set of resources for access point 202 that correspond to the bandwidth request. Resource scheduling component 316 can communicate the allocated resources to access point 202 over air interface communicating component 214, and resource receiving component 310 can obtain the communication over air interface communicating component 208. Access point 202 can utilize the indicated allocated resources in communicating with one or more wireless devices, as described.

It is to be appreciated that resource allocating component 314 can utilize a distributed resource allocation algorithm in providing inter-cell resource coordination among access point 202 and one or more disparate access points. For example, resource negotiation receiving component 312 can similarly obtain resource allocation requests from other access points (not shown), and thus resource allocating component 314 can manage resource allocation among the other access points, access point 202, and itself. As described, where resource allocation requests received at resource negotiation receiving component 312 include a priority of a respective access point, resource allocating component 314 can partition available resources to the access points according to priority (e.g., higher priority access points receive greater resource allocations). Similarly, where buffer levels or explicit bandwidth requests, etc. are received in the resource allocation requests, resource allocating component 314 can allocate resources to the access points that handle such.

In another example, parameter measuring component 306 can determine interference from one or more surrounding access points (not shown), and resource negotiating component can additionally provide one or more parameters regarding the interference to access point 204. Resource negotiation receiving component 312 can receive the one or more parameters regarding interference at access point 202, and resource allocating component 314 can additionally generate a resource allocation based on the one or more parameters. Thus, where the one or more parameters relates to a level of interference with a disparate access point beyond a threshold level, resource allocating component 314 can avoid scheduling similar resources to access point 202 and the disparate access point. In this regard, for example, resource allocating component 314 can create a jamming graph or a similar set of constraints that associate a plurality of access points based on interference with one another. The graph or constraints can be created based on the one or more parameters related to interference at the plurality of access points. Resource allocating component 314 can thus mitigate interference among the plurality of access point by varying resource scheduling so as not to schedule access points that interfere according to the jamming graph or set of constraints. In one example, parameter measuring component 306 can transmit such interference information to access point 202 in an enhanced scheduling request message, as defined in LTE.

Where not enough resources are available to adequately handle requested or determined resource allocations, resource allocating component 314, for example, can proportionally allocate resources based at least in part on requested or determined resource allocations. In addition, resource allocating component 314 can adjust current allocations to access points upon receiving a resource allocation request from a new access point (e.g., where substantially all resources are, or become, allocated). In another example, access points 202 and 204 can communicate to determine which access point will allocate resources (access point 204 in this example). For example, access points 202 and 204 can determine such based on comparing one or more local parameters, such as a type, priority, identifier (e.g., global cell identifier (GO), etc.), and/or the like, according to a configuration, specification, hard-coding, and/or the like.

In one example, parameter measuring component 306 can provide the one or more local parameters to access point 204 for such comparison (and vice versa where access point 204 also comprises a parameter measuring component 306) or can receive the one or more local parameters of access point 204. Thus, for example, parameter measuring component 306 can determine whether to allocate resources or request allocation based on comparing the one or more local parameters of access point 204 with its own local parameters. For instance, where access point 202 or 204 is a macro cell type access point, it can be responsible for allocating resources. In another example, the access point with the higher priority or identifier can be responsible for allocating resources, and the other access point can send the resource allocation requests, as described. In addition, for example, air interface communicating component 208 can utilize a slow time-scale discontinuous receive (DRX) mode for communicating with access point 204, where access point 202 acts like a UE in requesting resources. In this regard, access point 202 does not have to perform an initial access to access point 204 each time it communicates therewith. In another example, resource negotiating component can additionally negotiate predetermined communication time periods and/or intervals for communicating with access point 204 over the air interface. Moreover, for example, air interface communicating component 208 can implement a random backoff scheme when communicating with access point 204 to allow one or more disparate access points to communicate with access point 204.

Figure 4:
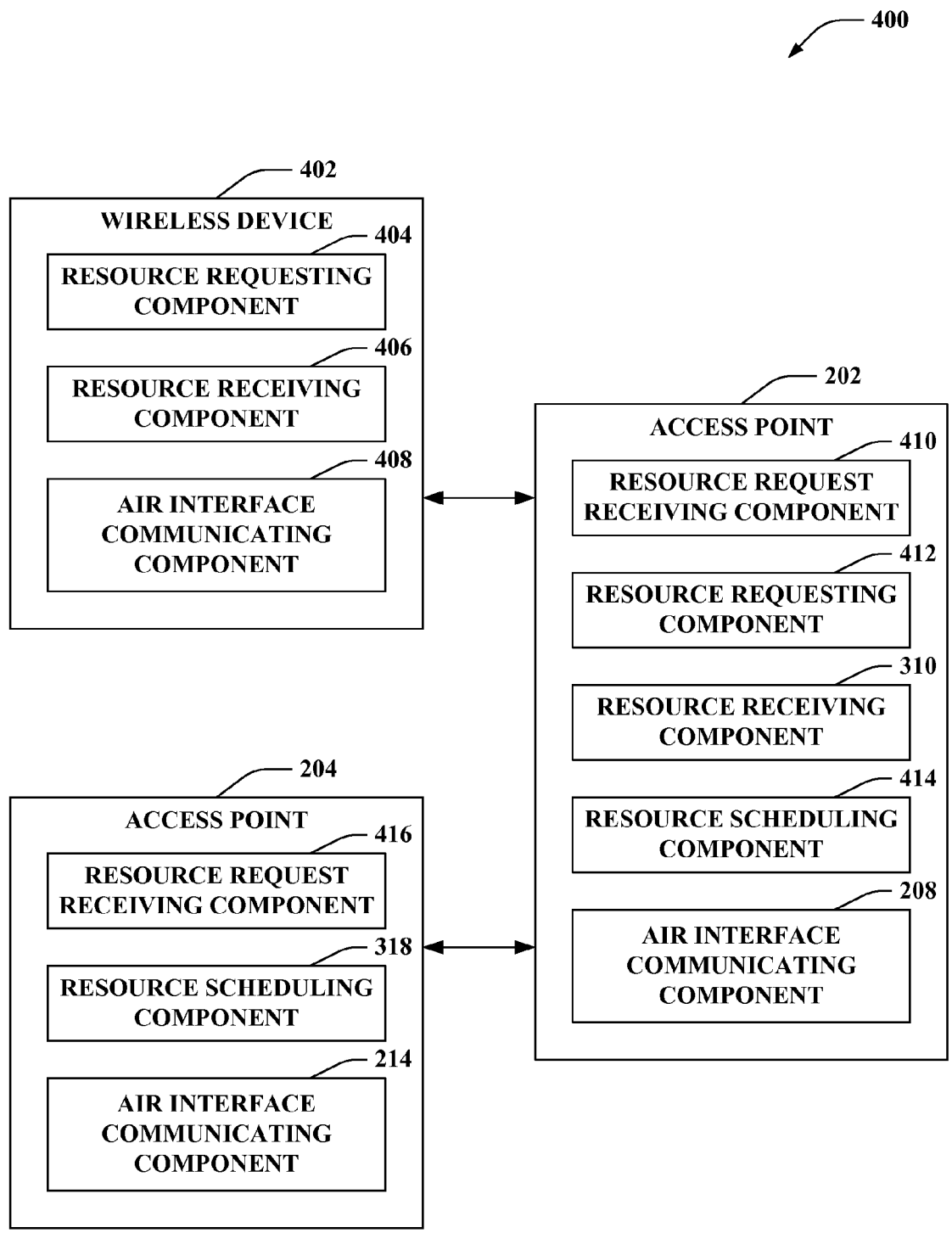
FIG. 4 is an illustration of an example wireless communications system that requests resources from an interfering access point for communicating with a device.

Turning now to FIG. 4, an example wireless communication system 400 that facilitates allocating resources to mitigate access point interference is illustrated. System 400 includes access points 202 and 204, which can be macro cell, femto cell, or pico cell access points, base stations, or other eNBs, for example, mobile devices, or portions thereof, or substantially any devices that provide one or more wireless devices with access to a wireless network, as described. In addition, access points 202 and 204 can be of a similar or disparate type and can communicate with each other to improve provided network access, for example. System 400 can also include a wireless device 402 that can receive wireless network access from access point 202. Wireless device 402 can be a mobile device, UE, a tethered device (such as a modem), a relay node, and/or substantially any device that receives access to a wireless network. Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between access points 202 and 204, and wireless device 402. In addition, for example, access point 202 can include components of access point 204 and/or vice versa to provide similar functionality to other access points or wireless devices.

Access point 202 can include a resource request receiving component 410 that obtains a resource allocation request from one or more wireless devices, a resource requesting component 412 that formulates a request for resources to a disparate access point for communicating with the one or more wireless devices, a resource receiving component 310 that obtains a resource allocation from the disparate access point, a resource scheduling component 414 that can provide a resource allocation to the one or more wireless device based on the resource allocation from the disparate access point, and an air interface communicating component 208 that facilitates transmitting data to and receiving data from the one or more wireless devices and the disparate access point over an air interface, as described.

Access point 204 can include a resource request receiving component 416 that obtains a resource allocation request from one or more disparate access points, a resource scheduling component 316 that assigns a set of resources to the one or more disparate access points based on the request, and an air interface communicating component 214 that facilitates transmitting data to and receiving data from the one or more wireless devices and the disparate access point over an air interface, as described. Wireless device 402 comprises a resource requesting component 404 that generates and transmits a request for resources to an access point for communicating therewith, a resource receiving component 406 that obtains a resource allocation from the access point, and an air interface communicating component 408 that transmits and/or receives related messages to/from the access point.

According to an example, access point 202 can determine that access point 204 actually or potentially interferes communications between access point 202 and/or one or more wireless devices. In one example, access point 202 can be a femto cell operating in a coverage area served by access point 204, which can be a macro cell, or vice versa, as described. In another example, both access point 202 and 204 can be femto cell access points that are situated such that they can cause interference to one another. As described, access points 202 and 204 can communicate with each other over respective air interface communicating components 208 and 214, which can be the same air interfaces utilized to communicate with wireless devices to provide wireless network access thereto. Where access point 202 determines potential interference from access point 204, it can communicate therewith to request resources for communicating with one or more wireless devices.

In an example, resource requesting component 404 can generate a request for resources to communicate with access point 202 and can utilize air interface communicating component 408 to transmit the message to access point 202. Resource request receiving component 410 can obtain the request from wireless device 402 over air interface communicating component 208. Resource requesting component 412 can similarly request resources from access point 204 using air interface communicating component 208. Resource request receiving component 416 can obtain the request from access point 202, and resource scheduling component 316 can provide a resource allocation to access point 202 over air interface communicating component 214. As described, resource requesting component 412 can specify a set of resources, a resource allocation size, a type of communication from wireless device 402 (e.g., data, voice, media streaming, etc.), and/or one or more similar parameters. Resource scheduling component 316 can allocate resources based on the one or more parameters.

Resource receiving component 310 can obtain the resource allocation from access point 204 over air interface communicating component 208, and resource scheduling component 414 can utilize the resource allocation to schedule wireless device 402. In one example, resource scheduling component 414 can provide at least a portion of the resource allocation to wireless device 402 for communicating with access point 202 over air interface communicating component 208. Resource receiving component 406 can obtain at least the portion of the resource allocation, and wireless device 402 can communicate with access point 202 using air interface communicating component 408 over the resources in at least the portion of the resource allocation.

Thus, access point 204 vacates or otherwise blanks transmission over the resource allocation. In one example, resource requesting component 412 and resource receiving component 310 can be part of a co-located wireless device (such as a co-located UE) of access point 202. In this regard, upon requesting resources from access point 204, access point 204 vacates the resources for communications from the co-located UE; however, access point 202 uses the vacated resources for scheduling communications with wireless device 402. Thus, existing resource requesting and granting procedures can be utilized to facilitate requesting blanking over resources among access points in this regard.

In an example, the request for resources transmitted by resource requesting component 412 can specify one or more parameters related to a desired or required allocation, such as a set of resources, a resource allocation size, a type of communication from the wireless device 402 (e.g., data, voice, media streaming, etc.). For example, resource requesting component 412 can generate the one or more parameters based at least in part on the request for resources received from wireless device 402. Resource request receiving component 416 can provide the one or more parameters to resource scheduling component 316, which can determine a resource allocation based at least in part on the one or more parameters and/or one or more similar parameters related to other access points and/or wireless devices communicating therewith. Thus, for example, where the one or more parameters relate to a type of communication, resource requesting component 412 can determine or estimate a resource allocation size required for the type of communication, or resource scheduling component 316 can determine such based on whether resource requesting component 412 provides the type of communication to the access point 204.

In either case, resource scheduling component 316 can determine a resource allocation based at least in part on a resource allocation size required for the type of communication, a requested resource allocation size, a requested resource allocation, and/or the like. In addition, resource scheduling component 316 can consider other resources assigned to access point 202 and/or to one or more disparate access point. For example, where access point 204 has assigned a threshold number of resources, it can repartition the resources to access point 202 and/or the disparate access points to accommodate the resource allocation for access point 202 related to wireless device 402. In any case, access point 202 can request resource blanking from access point 204 by requesting resources for communicating with wireless device 402.

Figure 5:
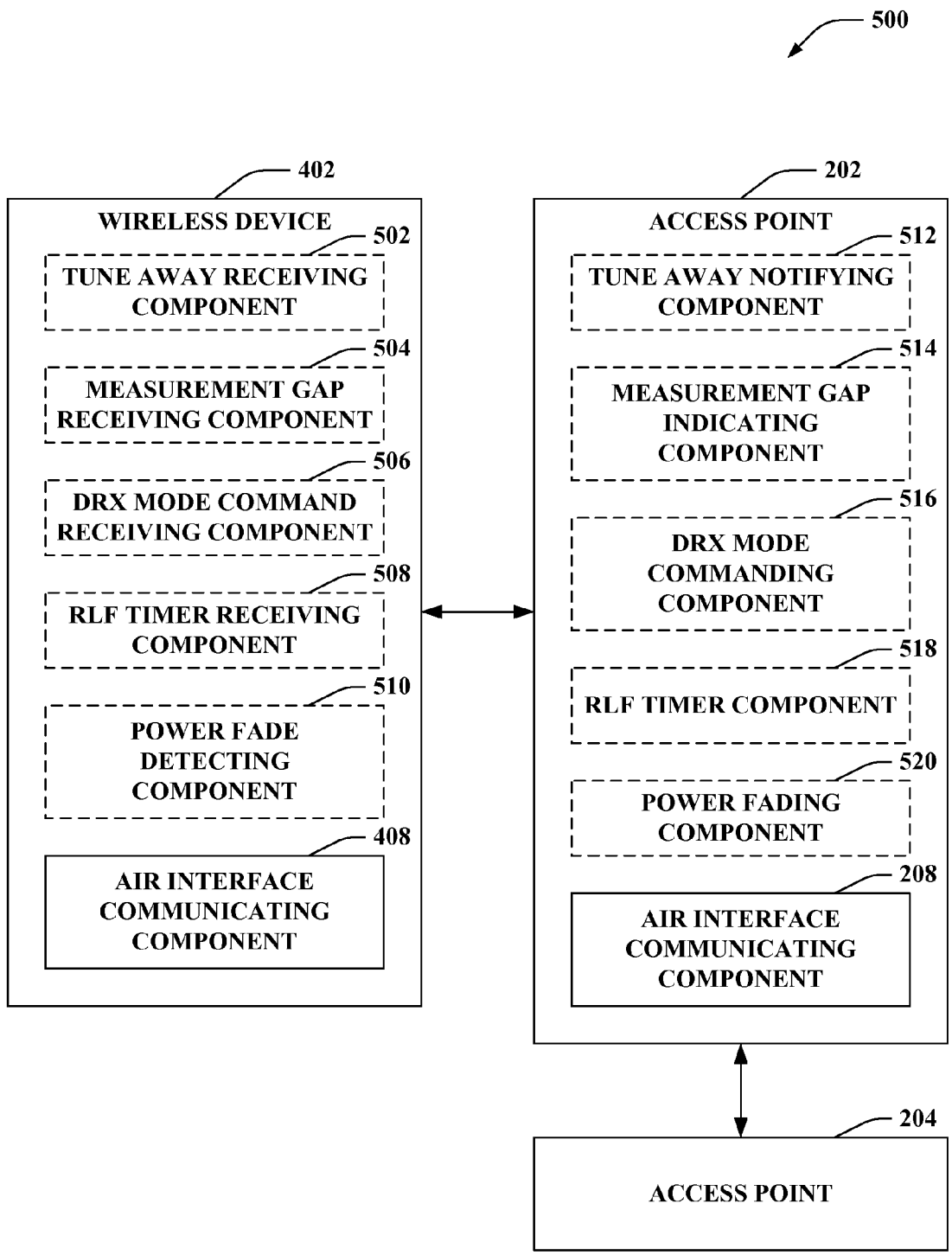
FIG. 5 is an illustration of an example wireless communications system that prepares a wireless device for tuning away for inter-access point communication.

Referring to FIG. 5, an example wireless communication system 500 that facilitates preparing wireless devices for tuning away by a serving access point is illustrated. System 500 includes access points 202 and 204, which can be macro cell, femto cell, or pico cell access points, base stations, or other eNBs, for example, mobile devices, or portions thereof, or substantially any devices that provide one or more wireless devices with access to a wireless network, as described. In addition, access points 202 and 204 can be of a similar or disparate type and can communicate with each other to improve provided network access, for example. System 500 can also include a wireless device 402 that can receive wireless network access from access point 202. Wireless device can be a mobile device, UE, a tethered device (such as a modem), a relay node, and/or substantially any device that receives access to a wireless network. Moreover, system 500 can be a MIMO system and/or can conform to one or more wireless network system specifications (e.g., EV-DO, 3GPP, 3GPP2, 3GPP LTE, WiMAX, etc.) and can comprise additional components to facilitate communication between access points 202 and 204, and wireless device 402.

Wireless device 402 can include one or more components that can exist and/or function together or in the alternative. For example, wireless device 402 can include one or more of the illustrated components while not having the other components. Thus, for instance, wireless device 402 can comprise a tune away receiving component 502 that obtains one or more parameters from an access point relating to time periods during which the access point communicates over an air interface with one or more disparate access points, a measurement gap receiving component 504 that obtains a measurement gap from an access point during which wireless device 402 can avoid communicating with the access point, a DRX mode command receiving component 506 that obtains a command from an access point that causes wireless device 402 to enter a DRX mode, a radio link failure (RLF) timer receiving component 508 that obtains an RLF timer from an access point relating to a period of inactivity after which wireless device 402 can assume the radio link with the access point has failed, and/or a power fade detecting component 510 that determines a step back in power from an access point. Wireless device 402 can additionally include an air interface communicating component 408 that transmits data to and receives data from an access point over an air interface.

Access point 202 can comprise one or more components, which can similarly exist in the alternative or in conjunction. Thus, access point 202 can comprise a tune away notifying component 512 that instructs non-legacy wireless devices regarding time periods during which access point 202 communicates with a disparate access point (e.g., whether transmitting or receiving), a measurement gap indicating component 514 that provides a measurement gap indication to a wireless device to indicate time periods during which the wireless device should not communicate with access point 202, a DRX mode commanding component 516 that can instruct the wireless device to enter a DRX mode, an RLF timer component 518 that can set one or more RLF timers related to communicating with the wireless device and provide the one or more RLF timers thereto, and/or a power fading component 520 that can step back transmission power over an air interface during a period of time. Access point 202 can also include an air interface communicating component 208 that transmits signals to or receives signals from one or more wireless devices and/or access points over an air interface.

As described, access point 202 can communicate with wireless device 402 over an air interface using air interface communicating component 208. According to an example, access point 202 can additionally communicate with access point 204 over the air interface using air interface communicating component 208. In this regard, access point 202 can perform one or more functions to ensure wireless device 402 does not attempt to communicate with access point 202 when access point 202 is communicating with access point 204 over the air interface. In one example, tune away notifying component 512 can generate one or more parameters regarding communicating with access point 204, such as one or more time periods of communication, a time interval between communications, and/or the like, and can transmit the one or more parameters to wireless device 402 over air interface communicating component 208 (e.g., in a broadcast signal, layer 3 (L3) signaling, etc.). Tune away receiving component 502 can receive the one or more parameters and can cause air interface communicating component 408 (or another component of wireless device 402) not to communicate with access point 202 during one or more time periods based on the one or more parameters.

In another example, measurement gap indicating component 514 can generate a measurement gap prior to access point 202 communicating with access point 204 and can transmit the measurement gap to wireless device 402 over air interface communicating component 208. Measurement gap receiving component 504 can obtain the measurement gap over air interface communicating component 408 and can cause air interface communicating component 408 not to transmit to or expect communications from access point 202 during the measurement gap. In one example, wireless device 402 can be a legacy device that includes mechanisms for processing measurement gaps such to not transmit to or receive from a specified device during the measurement gap.

In yet another example, DRX mode commanding component 516 can instruct wireless device 402 to enter a DRX mode prior to access point 202 communicating with access point 204. DRX mode command receiving component 506 can obtain the command from access point 202 to enter DRX mode over air interface communicating component 408. In this regard, wireless device 402 can enter DRX mode based on the command such that it receives communications from access point 202 during specified time periods in the DRX mode command. In one example, the DRX mode command can specify to enter into DRX mode upon receiving the command, during one or more subsequent time periods, according to a time interval, and/or the like.

Moreover, in an example, RLF timer component 518 can set an RLF timer related to communicating with wireless device 402 to allow sufficient time for access point 202 to communicate with access point 204 without the wireless device 402 determining RLF. RLF timer component 518 can provide the RLF timer to wireless device 402 using air interface communicating component 208, and RLF timer receiving component 508 can obtain the RLF timer. RLF timer receiving component 508 can set the RLF timer at the wireless device 402. Thus, for example, access point 202 can tune away from communicating with wireless device 402 and/or other wireless devices to communicate with access point 204. Tuning away can refer to communicating over a disparate frequency, for example. Wireless device 402 can detect possible RLF with access point 202 when it is tuned away (e.g., based on failure to receive response packets, pilot signals, reference signals, and/or the like from access point 202). Upon detecting possible RLF, wireless device 402 can initialize an RLF timer at the received RLF timer value. As the value allows access point 202 to communicate with access point 204, access point 202 can tune back to wireless device 402, and wireless device 402 can detect the link before expiry of the RLF timer, for example.

In a further example, power fading component 520 can begin fading transmission power when communicating to wireless device 402 to emulate channel fade before communicating with access point 204. Power fade detecting component 510 can detect decreases in transmission power and treat communications as a channel fade when or before access point 202 is communicating with access point 204. Thus, as shown, one or more of the components and related functions can be utilized to mitigate confusion to wireless device 402 that is potentially caused by access point 202 communicating with access point 204 over the air interface. In addition, it is to be appreciated that the foregoing components and functionalities can also be utilized for other tune away by access point 202, such as for self-synchronization, self-optimizing network (SON) measurements, etc.

Referring to FIGS. 6-9, methodologies relating to inter-access point communications over an air interface are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
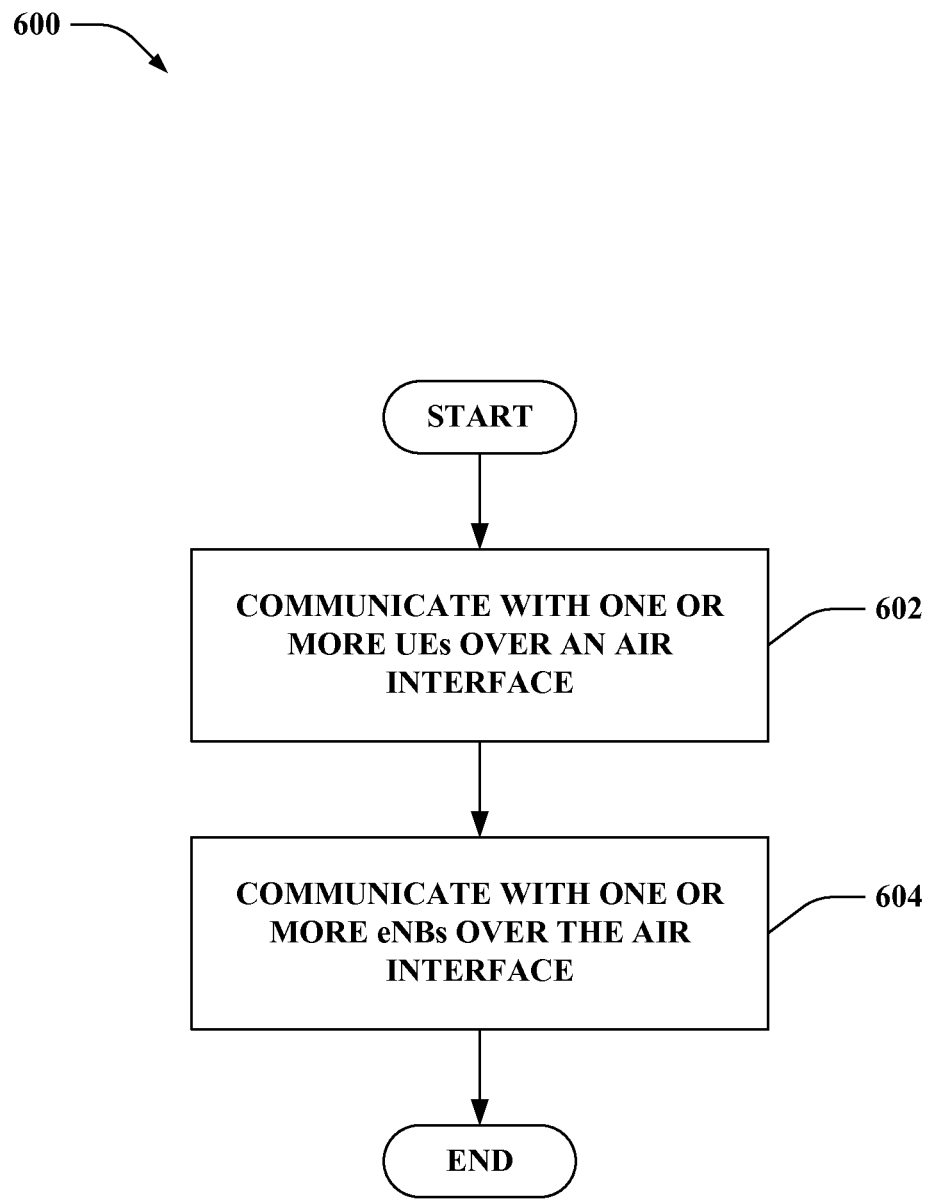
FIG. 6 is an illustration of an example methodology that facilitates communicating with eNBs and UEs over the same air interface.

Turning to FIG. 6, an example methodology 600 is illustrated that facilitates serving UEs and communicating with other eNBs over the same air interface. At 602, one or more UEs can be communicated with over an air interface. This can include allocating resources to the one or more UEs for receiving communications therefrom, as described. At 604, one or more eNBs can be communicated with over the air interface. In one example, this can include requesting or otherwise negotiating resource allocation from the one or more eNBs where the one or more eNBs may interfere with communications to the one or more UEs. Moreover, in this regard, communicating with the one or more eNBs can include providing parameters related to requesting or negotiating a resource allocation, receiving a resource allocation, and/or the like, as described. In addition, the one or more eNBs can be additionally communicated with over a wired backhaul link. Furthermore, in an example, communicating with the one or more UEs can include preparing the one or more UEs for tuning away to communicate with the one or more eNBs to mitigate RLF type of behavior by the one or more UEs.

Figure 7:
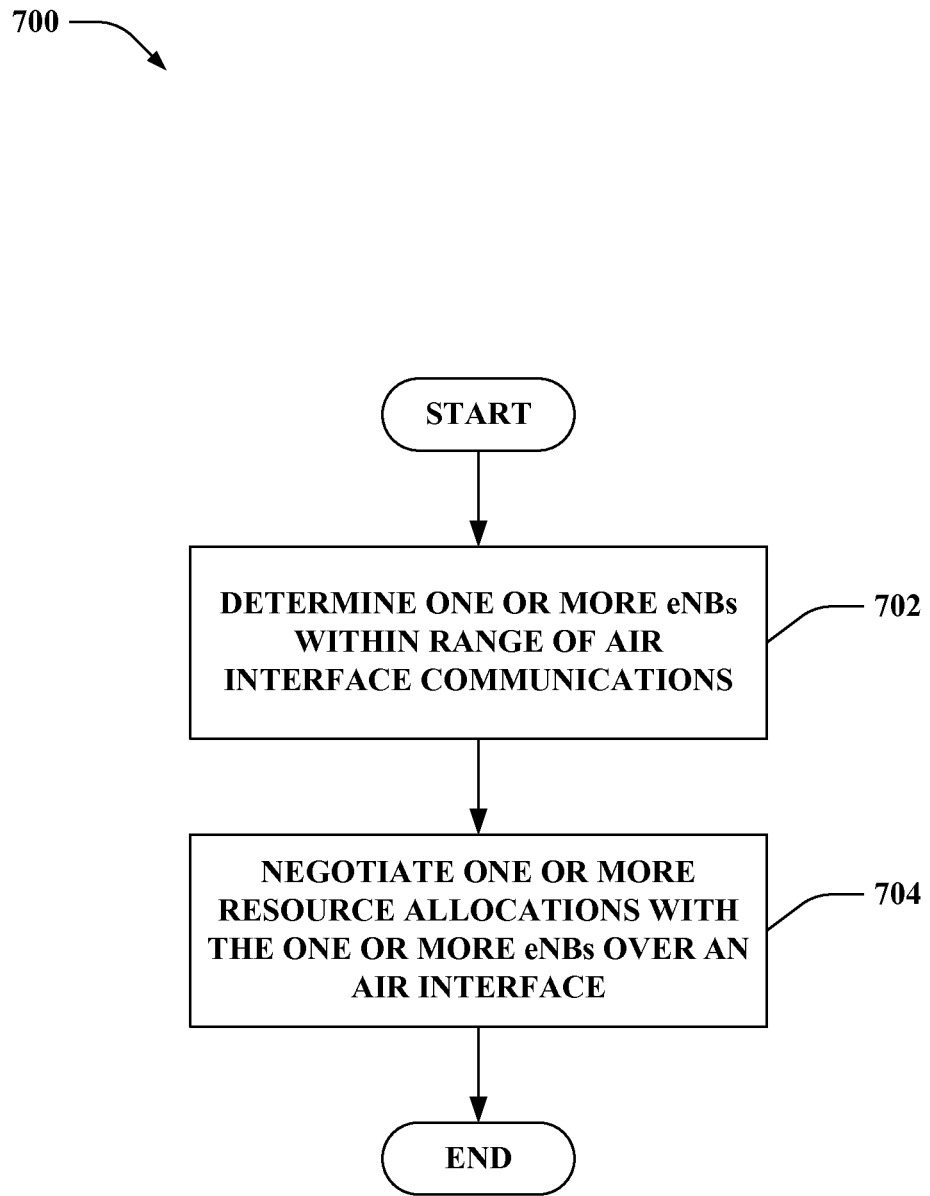
FIG. 7 is an illustration of an example methodology that negotiates resource allocations with one or more eNBs over an air interface.

Referring to FIG. 7, an example methodology 700 that facilitates negotiating resources with one or more eNBs over an air interface is illustrated. At 702, one or more eNBs within range of air interface communications can be determined For example, this can be determined according to detecting signals received from the one or more eNBs, information received from one or more served UEs, and/or the like. At 704, one or more resource allocations can be negotiated with the one or more eNBs over an air interface. For example, this can include requesting a resource allocation from the one or more eNBs, as described. One or more parameters can be specified in the request for example, such as a type of communication for which the resources are requested, a resource allocation size, an explicit request for certain resources, a priority, a type, an identifier, a communications load, and/or the like. Similarly, for example, negotiating the resource allocations can include receiving such parameters from the one or more eNBs and applying a resource allocation function based on the parameters, as described above. In this regard, negotiating the one or more resource allocations can include providing and/or receiving the allocation in light of the parameters, as described.

Figure 8:
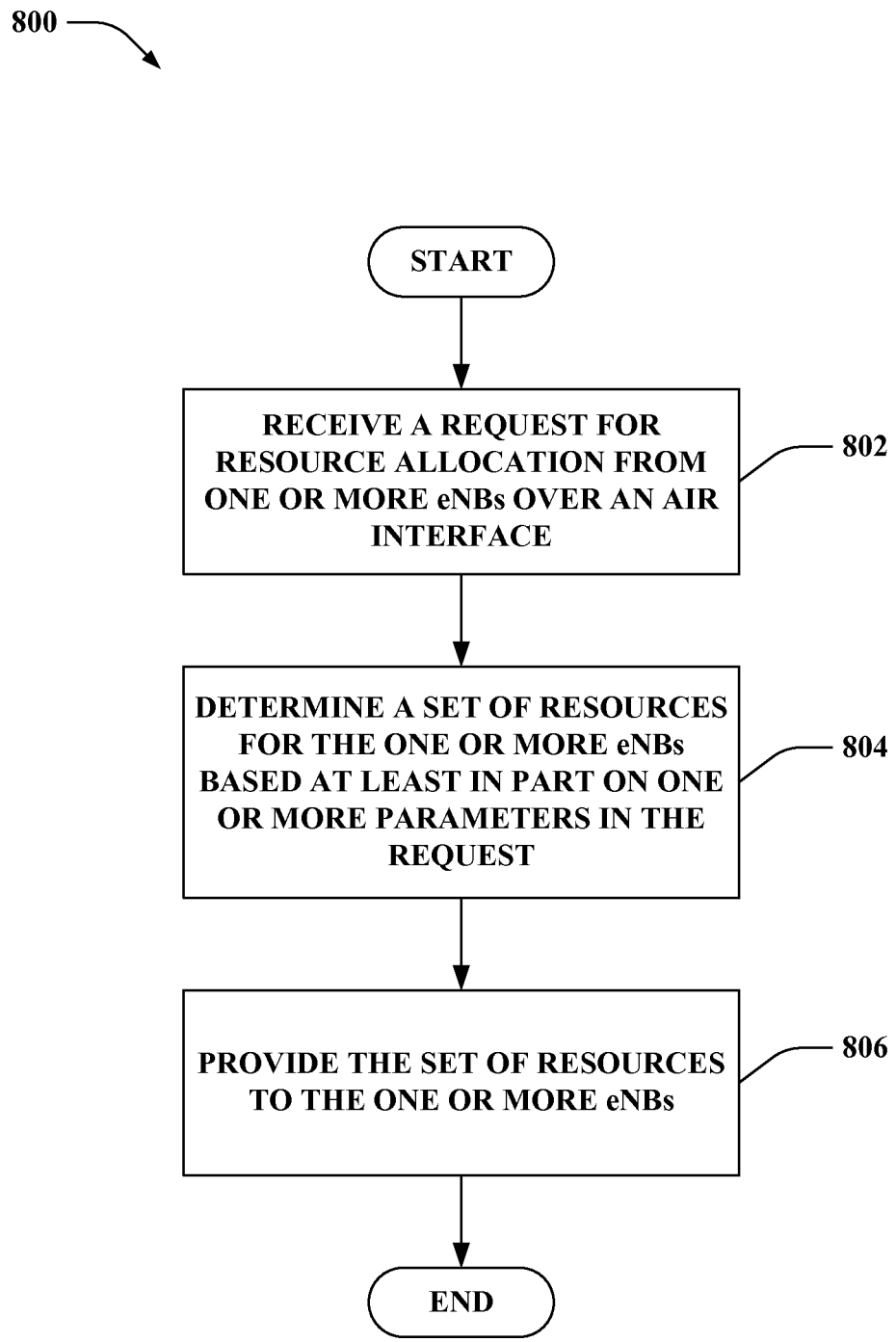
FIG. 8 is an illustration of an example methodology that facilitates allocating resources to one or more eNBs over an air interface.

Turning to FIG. 8, an example methodology 800 is shown that facilitates allocating resources to one or more eNBs over an air interface. At 802, a request for resource allocation can be received from one or more eNBs over an air interface. At 804, a set of resources can be determined for the one or more eNBs based at least in part on one or more parameters in the request. As described, the one or more parameters can be related to the one or more eNBs and/or communications between the one or more eNBs and one or more UEs. For example, the one or more parameters can include a buffer level related to communicating with the one or more UEs, a type of communication with the one or more UEs (e.g., voice, data, streaming media, etc.), a type or priority of the one or more eNBs, one or more parameters related to interference at the one or more eNBs from other eNBs, and/or the like.

For example, at 804, the set of resources can be determined such that the resources are adequate to transmit data according to the buffer level, the type of communication, and/or the like. In addition, for example the set of resources can be determined at 804 based further on similar parameters related to other eNBs. For instance, the resource can be determined by comparing priorities of a plurality of eNBs, such that eNBs with higher priority receive increased resources, as described. At 806, the set of resources can be provided to the one or more eNBs.

Figure 9:
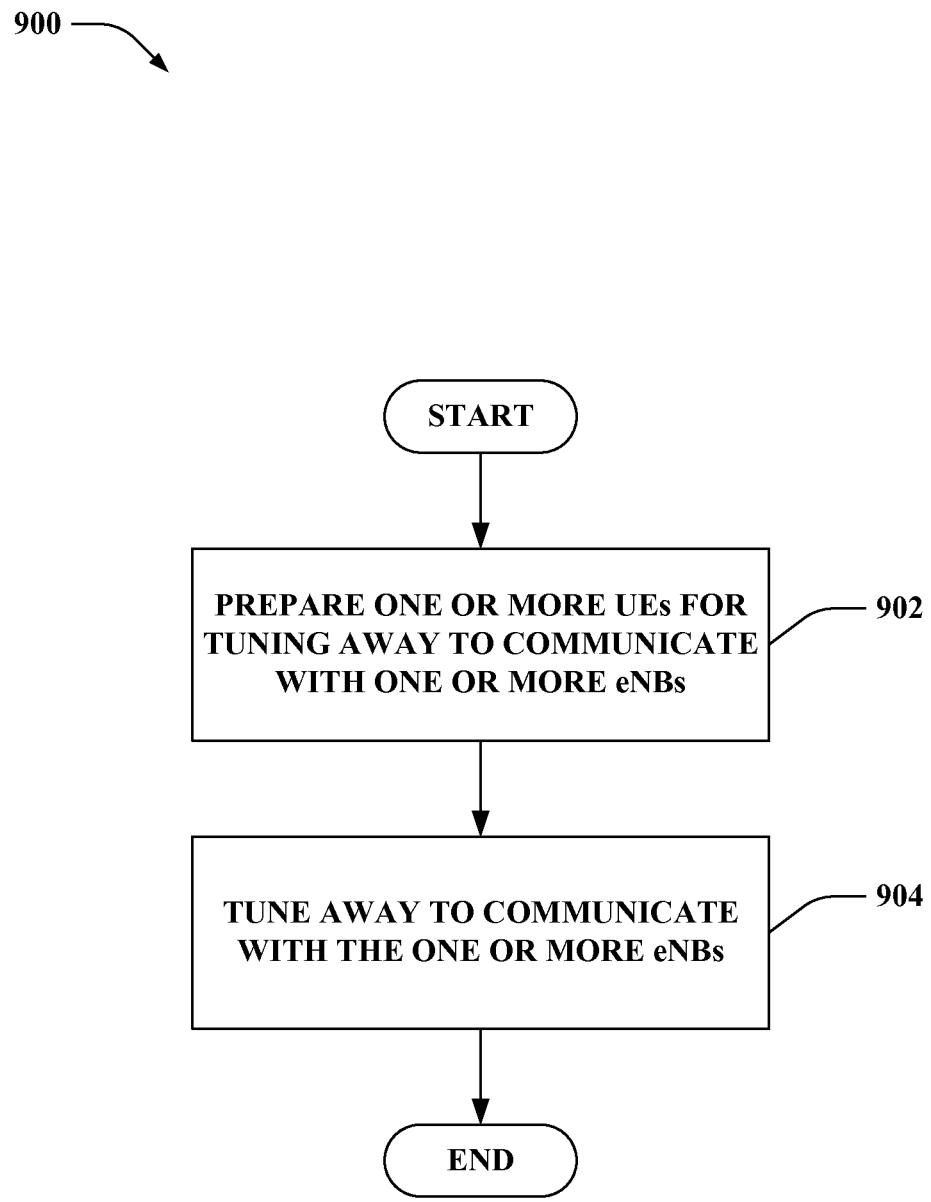
FIG. 9 is an illustration of an example methodology that prepares a UE for tuning away during inter-eNB communications.

Referring to FIG. 9, an example methodology 900 is shown that facilitates initializing one or more UEs when tuning away for inter-eNB communication. At 902, one or more UEs can be prepared for tuning away to communicate with one or more eNBs. As described, this can include transmitting a measurement gap, DRX mode command, or RLF timer to the one or more UEs. In another example, this can include providing explicit information regarding a time period or time interval related to communicating with the one or more eNBs. In yet another example, this can include fading transmission power to the one or more UEs to emulate a channel fade. In any case, at 904, one or more eNBs can be communicated with by tuning away. Thus, the UEs can avoid communicating during the time periods related to tuning away to communicate with the one or more eNBs.

It will be appreciated that, in accordance with one or more aspects described herein, inferences can be made regarding determining one or more distributed resource allocations, preparing UEs for tune away, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
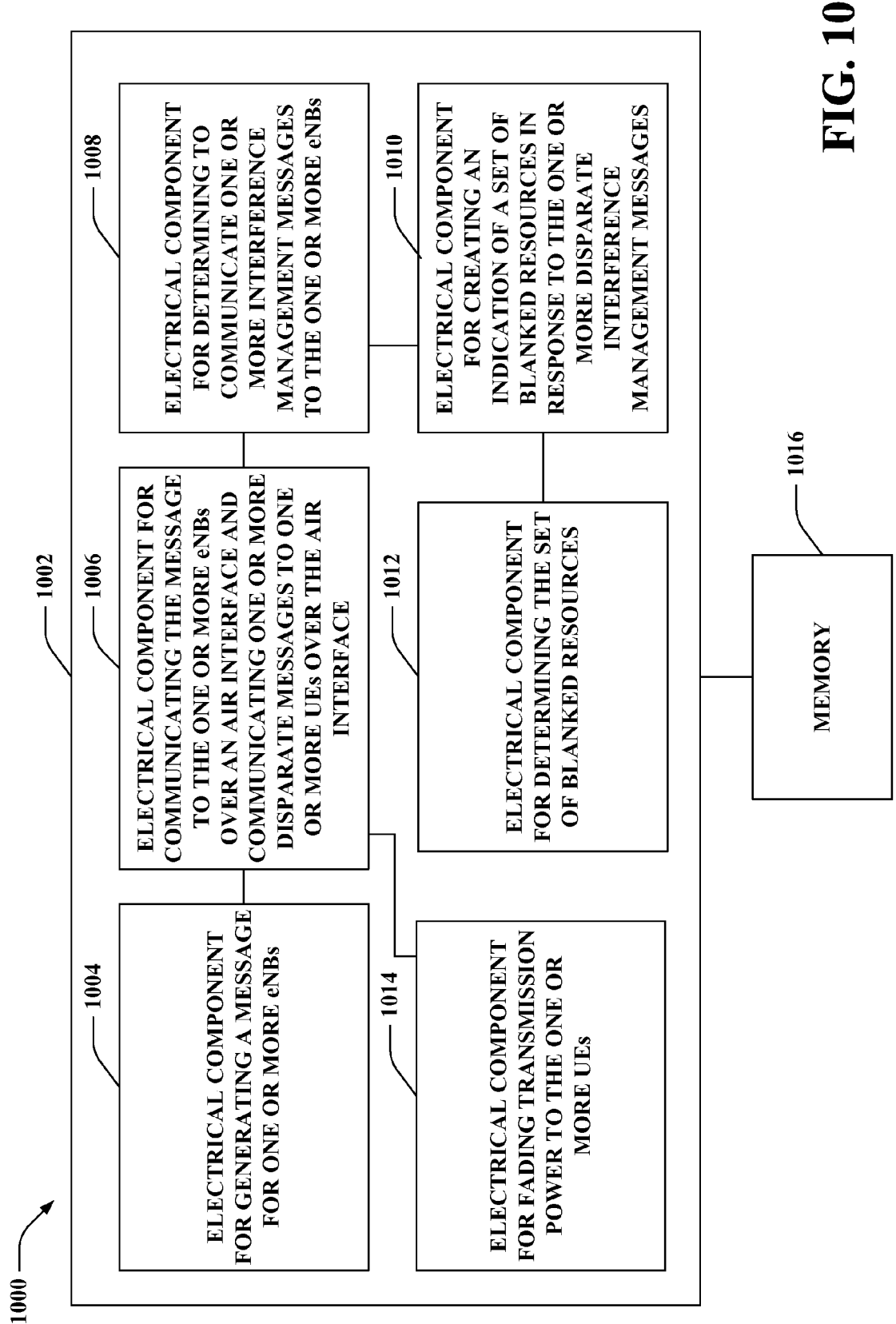
FIG. 10 is an illustration of an example system that facilitates inter-eNB communications.

With reference to FIG. 10, illustrated is a system 1000 for serving UEs and communicating with eNBs over the same air interface. For example, system 1000 can reside at least partially within a wireless network component. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for generating a message for one or more eNBs 1004. As described, the message can be one or more interference management messages that can be generated to request or negotiate resource allocation from one or more eNBs, a response to such a request, and/or the like. Further, logical grouping 1002 can comprise an electrical component for communicating the message to the one or more eNBs over an air interface and communicating one or more disparate messages to one or more UEs over the air interface 1006. As described, communicating with the one or more UEs can include serving the one or more UEs with wireless network access; in addition, the disparate message can include one or more messages or related parameters to prepare the one or more UEs for the electrical component 1006 tuning away to communicate with the one or more eNBs, as described.

Moreover, logical grouping 1002 can include an electrical component for determining to communicate one or more interference management messages to the one or more eNBs 1008. For example, electrical component 1008 can determine such based on one or more parameters related to the one or more eNBs. In one example, the parameters can include a type, identifier, priority, communications load, and/or the like of the one or more eNBs (and/or similar parameters of system 1000 or a related eNB), as described. Thus, in one example, if the one or more eNBs include a macro cell access point and system 1000 corresponds to or is implemented within a femto cell access point, electrical component 1008 can determine to request a resource allocation from the macro cell access point (and/or vice versa), as described. In another example, an access point with the lowest identifier value can apportion resources, and/or the like, as described.

Logical grouping 1002 can additionally include an electrical component for creating an indication of a set of blanked resources in response to the one or more disparate interference management messages 1010. Thus, for example, the one or more interference management messages can relate to a request for blanking and can include one or more parameters related to requesting blanking. In addition, logical grouping 1002 can include an electrical component for determining the set of blanked resources 1012. Thus, upon receiving a request for blanking, a set of resources can be apportioned for one or more eNBs, as described. The set of blanked resources can be determined according to a distributed allocation for a plurality of eNBs and/or based further on one or more received parameters relating to the one or more eNBs. The one or more parameters relating to the one or more eNBs, for example, can include a buffer level related to communicating with one or more UEs, a type of communications with the one or more UEs, a requested resource allocation size or explicit allocation detains, a type, identifier, or priority of the one or more eNBs, one or more parameters related to interference at the one or more eNBs, and/or the like, as described.

Moreover, logical grouping 1002 can include an electrical component for fading transmission power to the one or more UEs 1014. Thus, in one example, electrical component 1014 can decrease transmission power to the one or more UEs over a period of time to emulate a channel fade, as described, to prepare the one or more UEs for tune away by electrical component 1006. Additionally, system 1000 can include a memory 1016 that retains instructions for executing functions associated with electrical components 1004, 1006, 1008, 1010, 1012, and 1014. While shown as being external to memory 1016, it is to be understood that one or more of electrical components 1004, 1006, 1008, 1010, 1012, and 1014 can exist within memory 1016.

Figure 11:
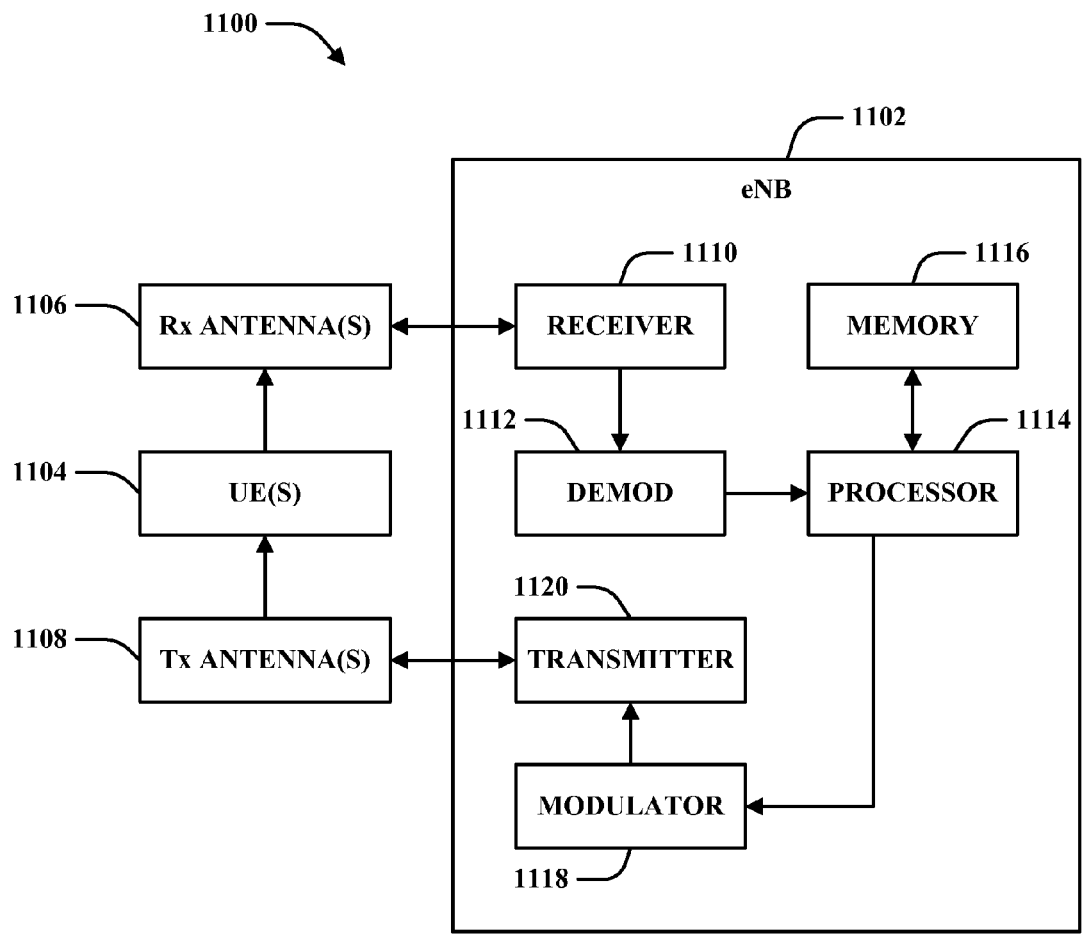
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or eNB 1102. As illustrated, eNB 1102 can receive signal(s) from one or more UEs 1104 via one or more receive (Rx) antennas 1106 and transmit to the one or more UEs 1104 via one or more transmit (Tx) antennas 1108. Additionally, eNB 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, eNB 1102 can employ processor 1114 to perform methodologies 600, 700, 800, 900, and/or other similar and appropriate methodologies. eNB 1102 can also include a modulator 1118 that can multiplex a signal for transmission by a transmitter 1120 through transmit antenna(s) 1108.

Figure 12:
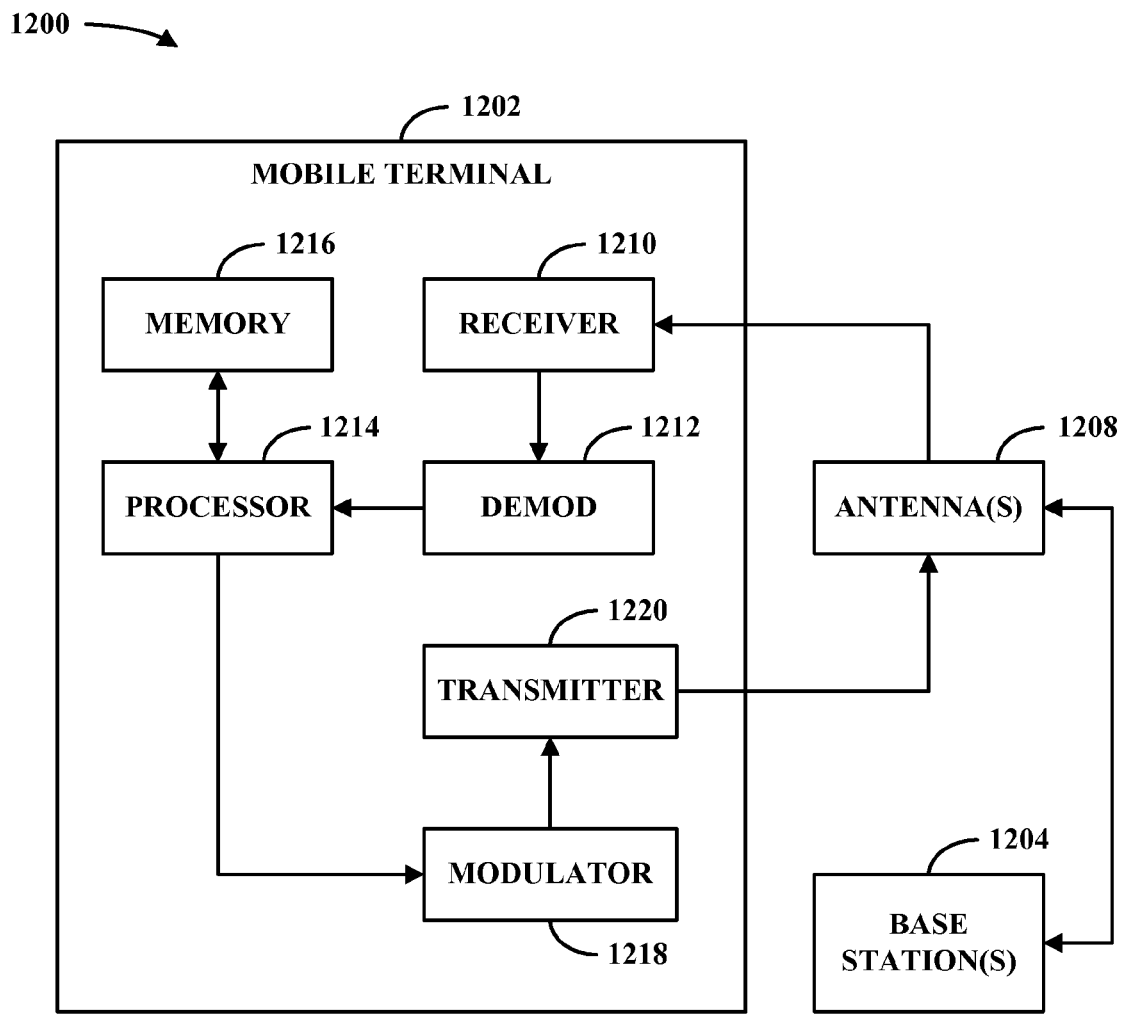

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna (s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 600, 700, 800, 900, and/or other similar and appropriate methodologies. Mobile terminal 1202 can also employ one or more components described in previous figures to effectuate the described functionality; in one example, the components can be implemented by the processor 1214. Mobile terminal 1202 can also include a modulator 1218 that can multiplex a signal for transmission by a transmitter 1220 through antenna (s) 1208.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNode B, macro cell, and so on. Also, a femto node may be configured or referred to as a Home Node B, Home eNode B, access point base station, femto cell, and so on.

Figure 13:
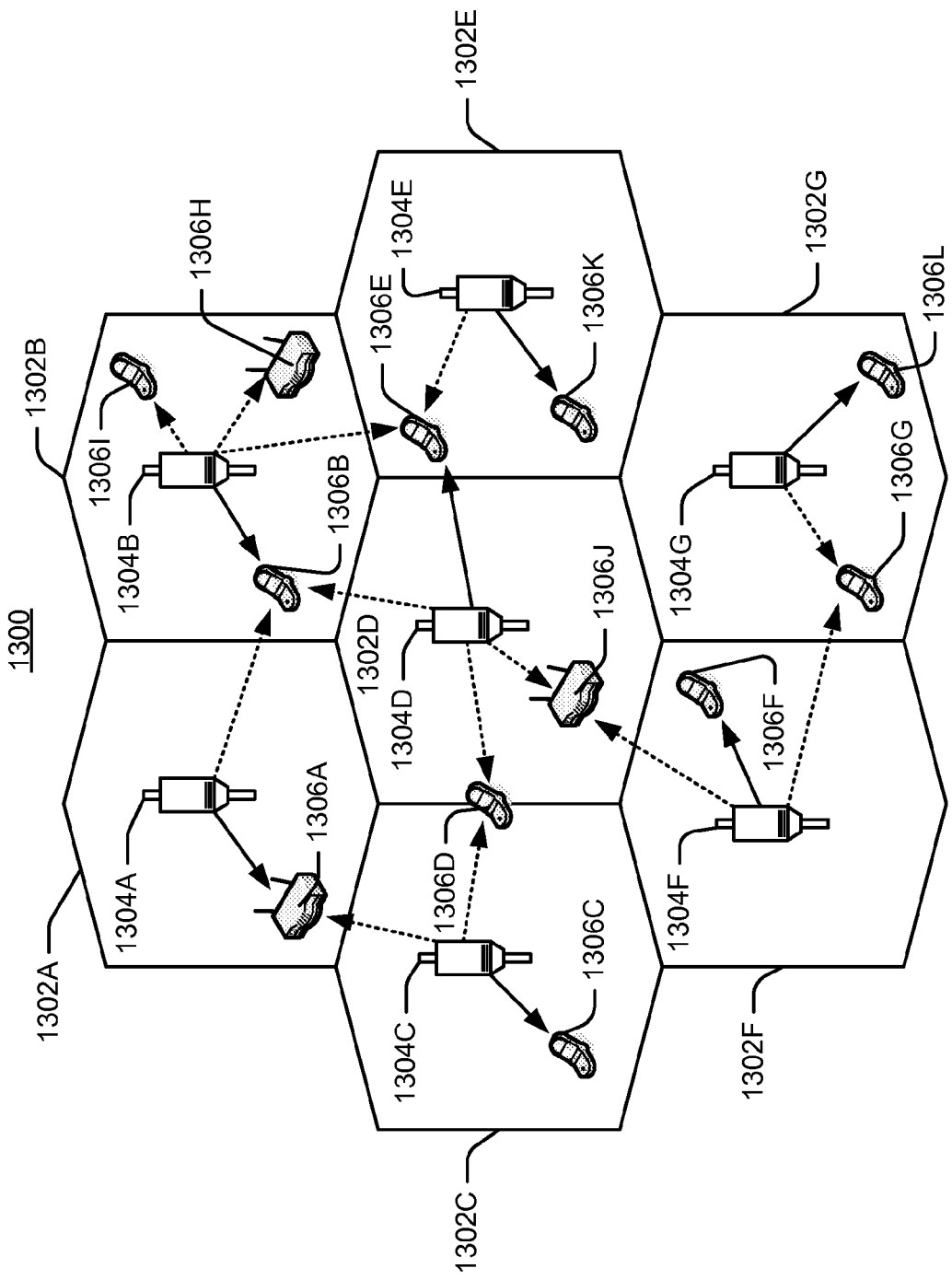
FIG. 13 is an illustration of an example wireless network environment that facilitates providing macro cell and femto cell access point communication.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access node 1304 (e.g., access nodes 1304A-1304G). As shown in FIG. 13, access terminals 1306 (e.g., access terminals 1306A-1306L) may be dispersed at various locations throughout the system over time. Each access terminal 1306 may communicate with one or more access nodes 1304 on a forward link (FL) and/or a reverse link (RL) at a given moment, depending upon whether the access terminal 1306 is active and whether it is in soft handoff, for example. The wireless communication system 1300 may provide service over a large geographic region. For example, macro cells 1302A-1302G may cover a few blocks in a neighborhood.

Figure 14:
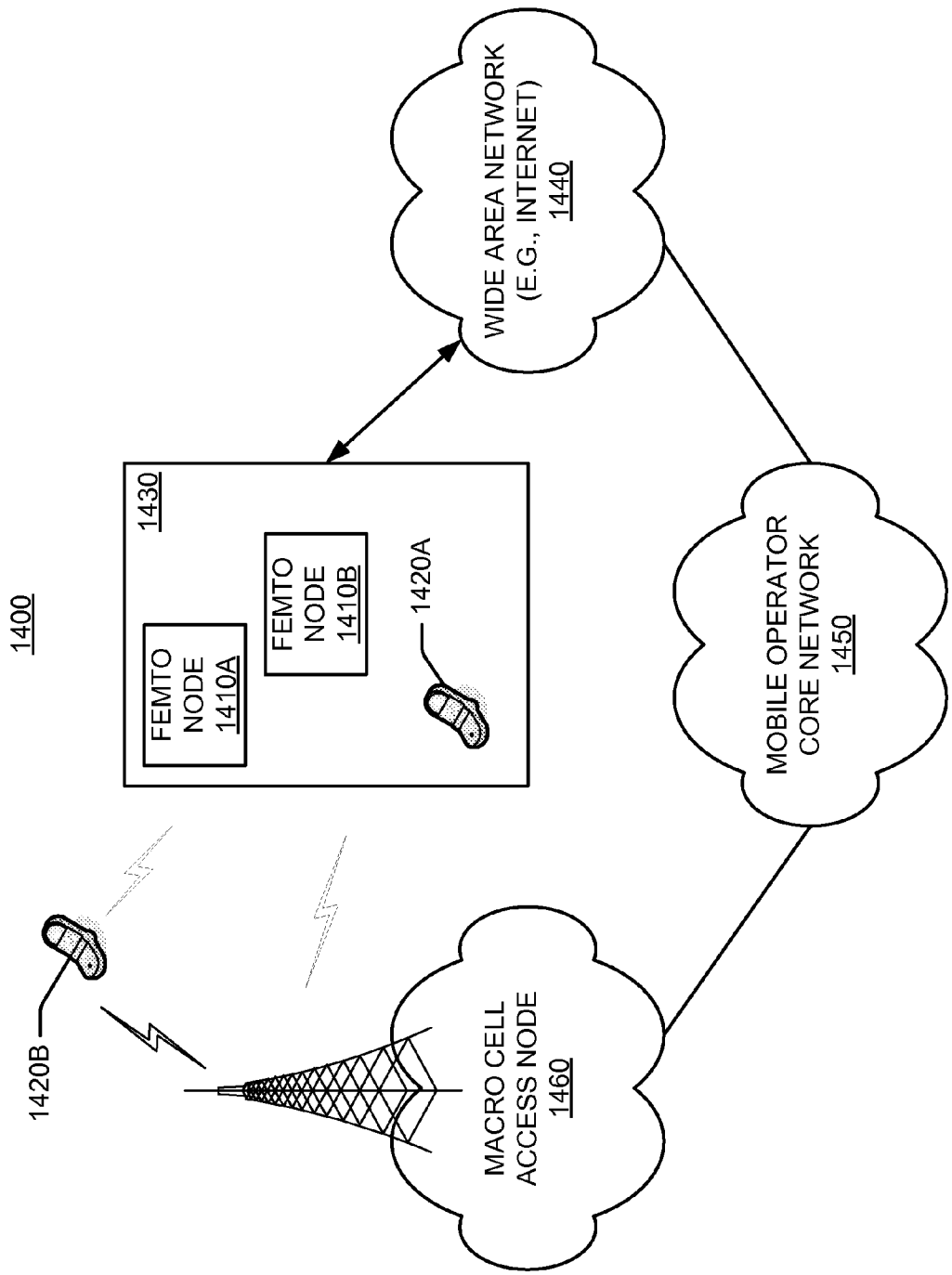
FIG. 14 is an illustration of an example wireless network environment that includes multiple types of access nodes.

FIG. 14 illustrates an exemplary communication system 1400 where one or more femto nodes are deployed within a network environment. Specifically, the system 1400 includes multiple femto nodes 1410 (e.g., femto nodes 1410A and 1410B) installed in a relatively small scale network environment (e.g., in one or more user residences 1430). Each femto node 1410 may be coupled to a wide area network 1440 (e.g., the Internet) and a mobile operator core network 1450 via a DSL router, a cable modem, a wireless link, or other connectivity means (not shown). As will be discussed below, each femto node 1410 may be configured to serve associated access terminals 1420 (e.g., access terminal 1420A) and, optionally, alien access terminals 1420 (e.g., access terminal 1420B). In other words, access to femto nodes 1410 may be restricted whereby a given access terminal 1420 may be served by a set of designated (e.g., home) femto node(s) 1410 but may not be served by any non-designated femto nodes 1410 (e.g., a neighbor's femto node 1410).

Figure 15:
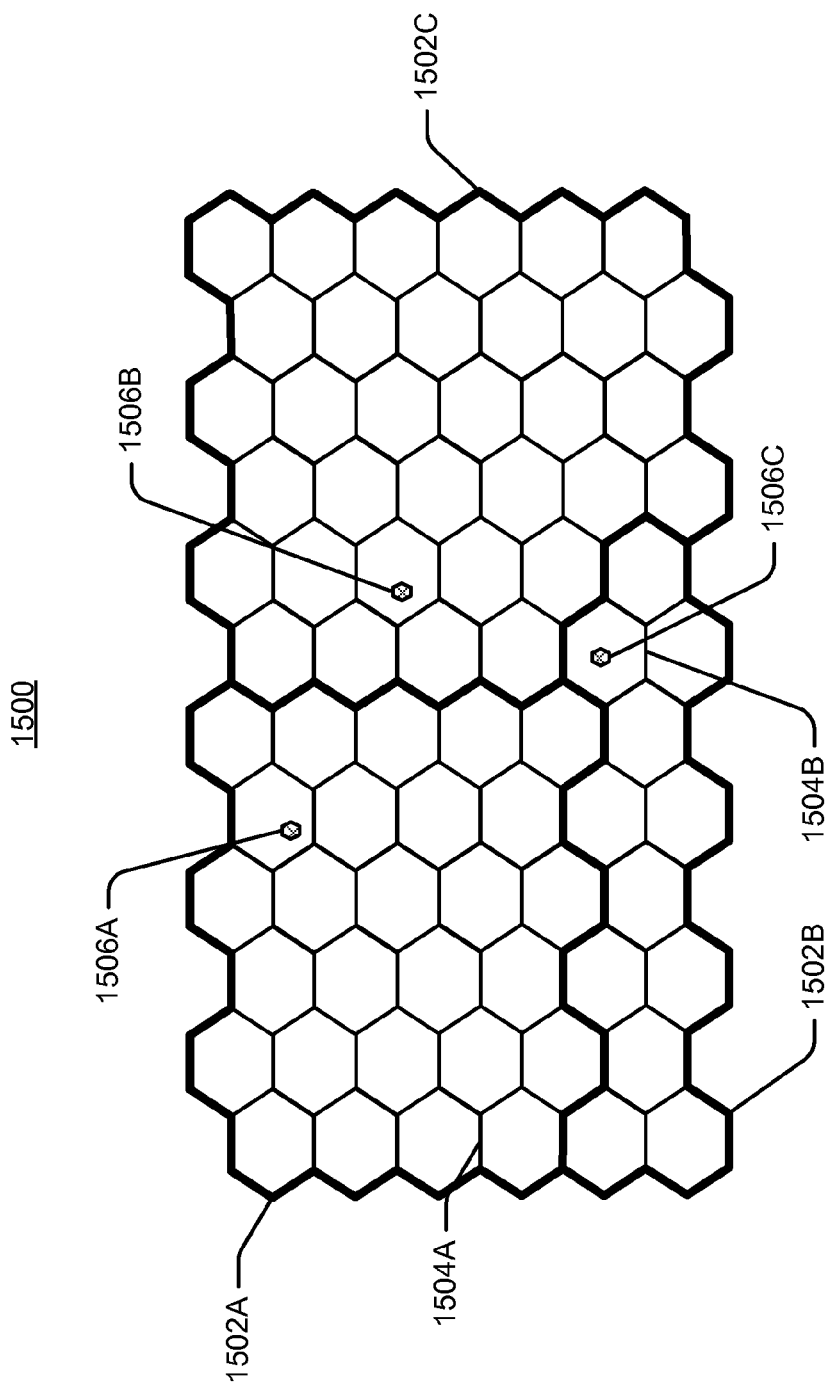
FIG. 15 is an illustration of an example wireless network environment having femto cell access points deployed within macro cells.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the hexagons. The tracking areas 1502 also include femto coverage areas 1506. In this example, each of the femto coverage areas 1506 (e.g., femto coverage area 1506C) is depicted within a macro coverage area 1504 (e.g., macro coverage area 1504B). It should be appreciated, however, that a femto coverage area 1506 may not lie entirely within a macro coverage area 1504. In practice, a large number of femto coverage areas 1506 may be defined with a given tracking area 1502 or macro coverage area 1504. Also, one or more pico coverage areas (not shown) may be defined within a given tracking area 1502 or macro coverage area 1504.

Referring again to FIG. 14, the owner of a femto node 1410 may subscribe to mobile service, such as, for example, 3G mobile service, offered through the mobile operator core network 1450. In addition, an access terminal 1420 may be capable of operating both in macro environments and in smaller scale (e.g., residential) network environments. In other words, depending on the current location of the access terminal 1420, the access terminal 1420 may be served by an access node 1460 of the mobile operator core network 1450 or by any one of a set of femto nodes 1410 (e.g., the femto nodes 1410A and 1410B that reside within a corresponding user residence 1430). For example, when a subscriber is outside his home, he is served by a standard macro access node (e.g., node 1460) and when the subscriber is at home, he is served by a femto node (e.g., node 1410A). Here, it should be appreciated that a femto node may be backward compatible with existing access terminals 1420.

A femto node 1410 may be deployed on a single frequency or, in the alternative, on multiple frequencies. Depending on the particular configuration, the single frequency or one or more of the multiple frequencies may overlap with one or more frequencies used by a macro node (e.g., node 1460).

In some aspects, an access terminal 1420 may be configured to connect to a preferred femto node (e.g., the home femto node of the access terminal 1420) whenever such connectivity is possible. For example, whenever the access terminal 1420 is within the user's residence 1430, it may be desired that the access terminal 1420 communicate only with the home femto node 1410.

In some aspects, if the access terminal 1420 operates within the mobile operator core network 1450 but is not residing on its most preferred network (e.g., as defined in a preferred roaming list), the access terminal 1420 may continue to search for the most preferred network (e.g., the preferred femto node 1410) using a Better System Reselection (BSR), which may involve a periodic scanning of available systems to determine whether better systems are currently available, and subsequent efforts to associate with such preferred systems. With the acquisition entry, the access terminal 1420 may limit the search for specific band and channel. For example, the search for the most preferred system may be repeated periodically. Upon discovery of a preferred femto node 1410, the access terminal 1420 selects the femto node 1410 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1410 that reside within the corresponding user residence 1430). In some implementations, a node may be restricted to not provide, for at least one node, at least one of: signaling, data access, registration, paging, or service.

In some aspects, a restricted femto node (which may also be referred to as a Closed Subscriber Group Home Node B) is one that provides service to a restricted provisioned set of access terminals. This set may be temporarily or permanently extended as necessary. In some aspects, a Closed Subscriber Group (CSG) may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_s$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 16:
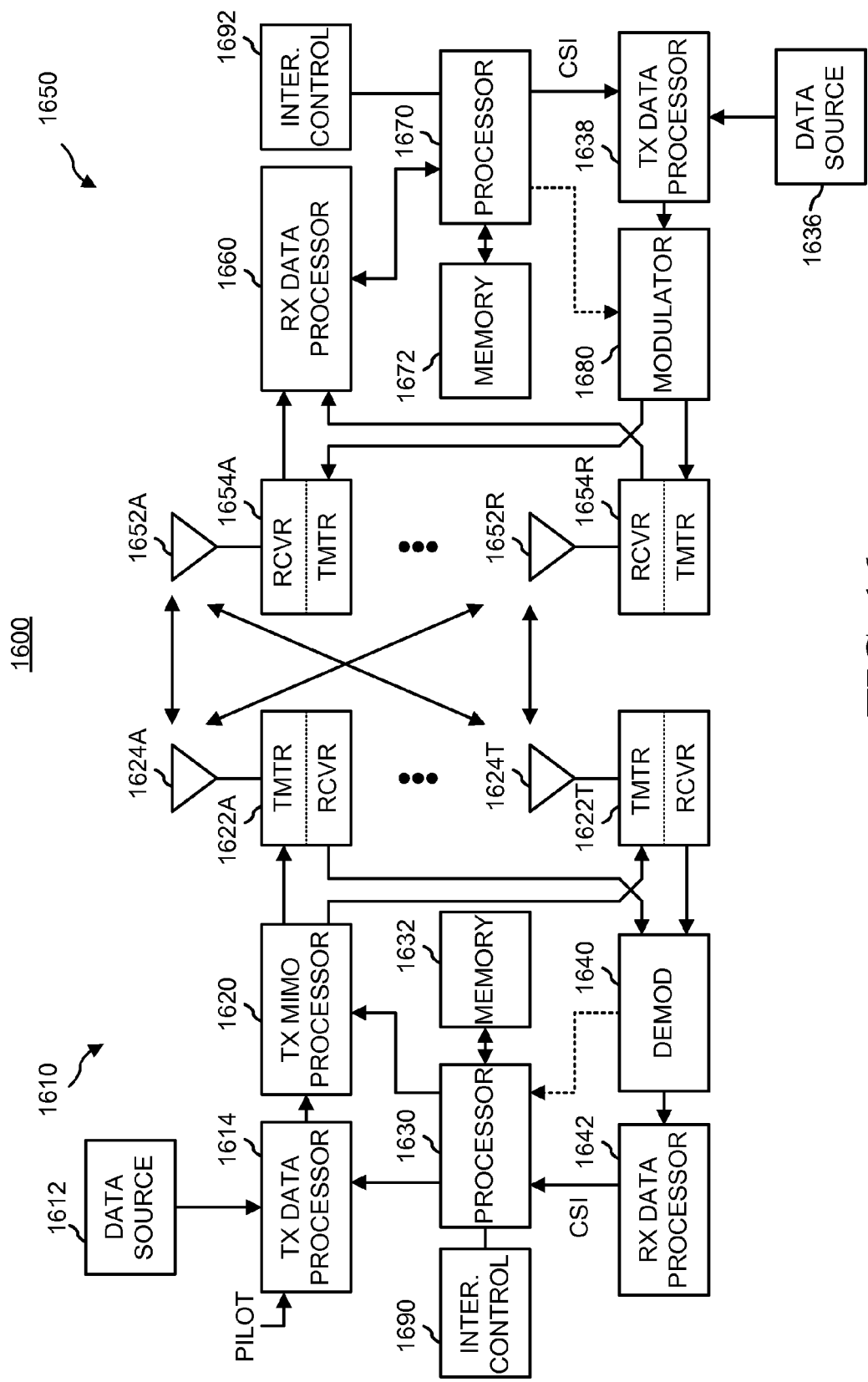
FIG. 16 is an illustration of an example wireless network environment that can be employed in conjunction with the various systems and methods described herein.

The teachings herein may be incorporated into a node (e.g., a device) employing various components for communicating with at least one other node. FIG. 16 depicts several sample components that may be employed to facilitate communication between nodes. Specifically, FIG. 16 illustrates a wireless device 1610 (e.g., an access point) and a wireless device 1650 (e.g., an access terminal) of a MIMO system 1600. At the device 1610, traffic data for a number of data streams is provided from a data source 1612 to a transmit (TX) data processor 1614.

In some aspects, each data stream is transmitted over a respective transmit antenna. The TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers (XCVR) 1622A through 1622T. In some aspects, the TX MIMO processor 1620 applies beam-forming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver (XCVR) 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

A receive (RX) data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which pre-coding matrix to use (discussed below). The processor 1670 formulates a reverse link message comprising a matrix index portion and a rank value portion. A data memory 1672 may store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1620, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator (DEMOD) 1640, and processed by a RX data processor 1642 to extract the reverse link message transmitted by the device 1650. The processor 1630 then determines which pre-coding matrix to use for determining the beam-forming weights then processes the extracted message.

FIG. 16 also illustrates that the communication components may include one or more components that perform interference control operations as taught herein. For example, an interference (INTER) control component 1690 may cooperate with the processor 1630 and/or other components of the device 1610 to send/receive signals to/from another device (e.g., device 1650) as taught herein. Similarly, an interference control component 1692 may cooperate with the processor 1670 and/or other components of the device 1650 to send/receive signals to/from another device (e.g., device 1610). It should be appreciated that for each device 1610 and 1650 the functionality of two or more of the described components may be provided by a single component. For example, a single processing component may provide the functionality of the interference control component 1690 and the processor 1630 and a single processing component may provide the functionality of the interference control component 1692 and the processor 1670.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:
1. A method, comprising:
  communicating with one or more wireless terminals over an air interface;
  communicating with one or more base stations over a link allocated for communications between base stations; and
  communicating blanking information with the one or more base stations over the air interface when the link is unreliable for communicating with the one or more base stations, wherein the blanking information is used to establish a distributed resource allocation for communicating with the one or more wireless terminals.

2. The method of claim 1, wherein the communicating with the one or more base stations over the air interface comprises exchanging one or more interference management messages with the one or more base stations over the air interface.

3. The method of claim 2, wherein the exchanging the one or more interference management messages includes requesting blanking from the one or more base stations over the air interface for communicating with the one or more wireless terminals or receiving an indication of a set of resources blanked by the one or more base stations over the air interface.

4. The method of claim 2, further comprising determining to exchange the one or more interference management messages with the one or more base stations based at least in part on one or more parameters related to the one or more base stations.

5. The method of claim 4, wherein the one or more parameters include an identifier of the one or more base stations, an assigned priority of the one or more base stations, a type of the one or more base stations, or a communications load on the one or more base stations.

6. The method of claim 2, wherein the exchanging the one or more interference management messages includes receiving a blanking request from the one or more base stations over the air interface.

7. The method of claim 2, further comprising blanking transmission over a set of blanked resources based at least in part on the one or more interference management messages.

8. The method of claim 7, further comprising providing an indication of the set of blanked resources to the one or more base stations over the air interface in response to exchanging the one or more interference management messages with the one or more base stations over the air interface.

9. The method of claim 8, further comprising determining the set of blanked resources based at least in part on a buffer level of a disparate wireless terminal, wherein the exchanging the one or more interference management messages with the one or more base stations over the air interface further comprises receiving the buffer level of the disparate wireless terminal from the one or more base stations over the air interface.

10. The method of claim 8, further comprising determining the set of blanked resources and a disparate set of resources for blanking for one or more disparate base stations based at least in part on an assigned priority of the one or more base stations, wherein the exchanging the one or more interference management messages with the one or more base stations over the air interface further comprises receiving the assigned priority of the one or more base stations from the one or more base stations over the air interface.

11. The method of claim 8, further comprising determining the set of blanked resources based at least in part on one or more parameters regarding interference of one or more disparate base stations to the one or more base stations over the air interface, wherein the exchanging the one or more interference management messages with the one or more base stations over the air interface further comprises receiving the one or more parameters regarding the interference.

12. The method of claim 2, wherein the exchanging the one or more interference management messages with the one or more base stations over the air interface includes providing an identifier, a type, or a communications load to the one or more base stations over the air interface.

13. The method of claim 1, wherein the communicating with the one or more base stations includes communicating with a co-located wireless terminal of the one or more base stations.

14. The method of claim 13, wherein the communicating with the one or more base stations includes receiving a resource allocation request from the co-located wireless terminal.

15. The method of claim 1, wherein the communicating with the one or more base stations over the air interface includes communicating with the one or more base stations using a co-located wireless terminal.

16. The method of claim 15, wherein the communicating with the one or more base stations using the co-located wireless terminal includes requesting a resource allocation from the one or more base stations using the co-located wireless terminal.

17. The method of claim 1, wherein the communicating with the one or more base stations over the air interface further comprises transmitting a buffer level related to communicating with the one or more wireless terminals to the one or more base stations over the air interface.

18. The method of claim 1, wherein the communicating with the one or more base stations over the air interface comprises providing one or more parameters relating to interference from one or more disparate base stations to the one or more base stations over the air interface.

19. The method of claim 1, wherein the communicating with the one or more base stations over the air interface comprises providing an assigned priority to the one or more base stations over the air interface.

20. The method of claim 1, wherein the communicating with the one or more wireless terminals over the air interface comprises indicating a measurement gap to the one or more wireless terminals related to communicating with the one or more base stations.

21. The method of claim 1, wherein the communicating with the one or more wireless terminals over the air interface comprises signaling the one or more wireless terminals to enter a discontinuous receive mode when communicating with the one or more base stations.

22. The method of claim 1, further comprising fading transmission power to the one or more wireless terminals prior to communicating with the one or more base stations.

23. The method of claim 1, wherein the communicating with the one or more wireless terminals over the air interface comprises providing one or more radio link failure timers to the one or more wireless terminals prior to communicating with the one or more base stations.

24. The method of claim 1, wherein the communicating with the one or more wireless terminals over the air interface comprises indicating one or more parameters regarding time periods or time intervals related to communicating with the one or more base stations.

25. The method of claim 1, wherein the link allocated for communications between base stations includes a wired backhaul link.

26. A wireless communications apparatus, comprising:
at least one processor configured to:
transmit one or more data signals to one or more wireless terminals over an air interface;
communicate with one or more base stations over a link allocated for communications between base stations; and
communicate blanking information with the one or more base stations over the air interface when the link is unreliable for communicating with the one or more base stations, wherein the blanking information is used to establish a distributed resource allocation for communicating with the one or more wireless terminals; and a memory coupled to the at least one processor.

27. The wireless communications apparatus of claim 26, wherein the at least one processor communicates with the one or more base stations at least in part by communicating one or more interference management messages with the one or more base stations over the air interface.

28. The wireless communications apparatus of claim 27, wherein the one or more interference management messages includes a blanking request.

29. The wireless communications apparatus of claim 27, wherein the one or more interference management messages includes an indication of a set of resources blanked by the one or more base stations.

30. The wireless communications apparatus of claim 27, wherein the at least one processor is further configured to determine to exchange the one or more interference management messages with the one or more base stations based at least in part on one or more parameters related to the one or more base stations.

31. The wireless communications apparatus of claim 27, wherein the at least one processor is further configured to blank transmission over a set of blanked resources based at least in part on the one or more interference management messages.

32. The wireless communications apparatus of claim 31, wherein the at least one processor is further configured to communicate an indication of the set of blanked resources to the one or more base stations.

33. The wireless communications apparatus of claim 32, wherein the one or more interference management messages includes a buffer level of a disparate wireless terminal, an assigned priority of the one or more base stations, or one or more interference parameters, and the at least one processor is further configured to determine the set of blanked resources based at least in part on the buffer level of the disparate wireless terminal, the assigned priority of the one or more base stations, or the one or more interference parameters.

34. The wireless communications apparatus of claim 33, wherein the at least one processor is further configured to determine a disparate set of blanked resources for blanking for one or more disparate base stations based at least in part on the buffer level of the disparate wireless terminal, the assigned priority of the one or more base stations, or the one or more interference parameters.

35. The wireless communications apparatus of claim 26, wherein the at least one processor communicates with the one or more base stations by communicating with a co-located wireless terminal of the one or more base stations.

36. The wireless communications apparatus of claim 35, wherein the at least one processor is further configured to receive a resource allocation request from the co-located wireless terminal.

37. The wireless communications apparatus of claim 26, wherein the at least one processor communicates with the one or more base stations using a wireless terminal that is co-located with the wireless communications apparatus.

38. The wireless communications apparatus of claim 37, wherein the at least one processor communicates a resource allocation request to the one or more base stations using the wireless terminal that is co-located with the wireless communications apparatus.

39. The wireless communications apparatus of claim 26, wherein the at least one processor communicates with the one or more base stations at least in part by communicating a buffer level related to the one or more wireless terminals, an assigned priority related to the wireless communications apparatus, or one or more parameters relating to interference from one or more disparate base stations to the one or more base stations over the air interface.

40. The wireless communications apparatus of claim 26, wherein the one or more data signals includes a measurement gap related to communicating with the one or more base stations, a command to enter a discontinuous receive mode over one or more time periods during which the at least one processor communicates with the one or more base stations, or one or more parameters regarding time periods or time intervals during which the at least one processor communicates with the one or more base stations.

41. The wireless communications apparatus of claim 26, wherein the at least one processor is further configured to fade transmission power for transmitting the one or more data signals to the one or more wireless terminals over a period of time before communicating with the one or more base stations.

42. The wireless communications apparatus of claim 26, wherein the one or more data signals includes one or more radio link failure timers, and the at least one processor transmits the one or more radio link failure timers to the one or more wireless terminals before communicating with the one or more base stations.

43. The wireless communications apparatus of claim 26, wherein the link allocated for communications between base stations includes a wired backhaul link.

44. An apparatus, comprising:
means for communicating with one or more base stations over a link allocated for communications between base stations;
means for generating a message comprising blanking information for the one or more base stations, wherein the blanking information is used to establish a distributed resource allocation for communicating with one or more wireless terminals;
means for communicating the message to the one or more base stations over an air interface when the link is unreliable for communicating with the one or more base stations; and
means for communicating one or more disparate messages to the one or more wireless terminals over the air interface.

45. The apparatus of claim 44, wherein the message includes one or more interference management messages.

46. The apparatus of claim 45, wherein the one or more interference management messages comprise a request for blanking or an indication of a set of resources blanked by the one or more base stations.

47. The apparatus of claim 45, further comprising means for determining to communicate the one or more interference management messages to the one or more base stations based at least in part on one or more parameters related to the one or more base stations.

48. The apparatus of claim 47, wherein the one or more parameters related to the one or more base stations include an identifier of the one or more base stations, an assigned priority of the one or more base stations, a type of the one or more base stations, or a communications load on the one or more base stations, and the one or more interference management messages include a request for a resource allocation.

49. The apparatus of claim 45, wherein the means for communicating the message to the one or more base stations further receives a blanking request from the one or more base stations over the air interface.

50. The apparatus of claim 45, wherein the means for communicating the message to the one or more base stations blanks transmission over a set of blanked resources based at least in part on one or more disparate interference management messages received from the one or more base stations.

51. The apparatus of claim 50, further comprising means for creating an indication of the set of blanked resources in response to the one or more disparate interference management messages, wherein the one or more interference management messages includes the indication of the set of blanked resources.

52. The apparatus of claim 51, further comprising means for determining the set of blanked resources based at least in part on a buffer level of a disparate wireless terminal, wherein the one or more disparate interference management messages received from the one or more base stations includes the buffer level of the disparate wireless terminal.

53. The apparatus of claim 51, further comprising means for determining the set of blanked resources based at least in part on an assigned priority of the one or more base stations, wherein the one or more disparate interference management messages received from the one or more base stations includes the assigned priority of the one or more base stations.

54. The apparatus of claim 51, further comprising means for determining the set of blanked resources based at least in part on one or more parameters regarding interference at the one or more base stations from one or more disparate base stations, wherein the one or more disparate interference management messages received from the one or more base stations includes the one or more parameters regarding the interference.

55. The apparatus of claim 45, wherein the one or more interference management messages comprises an identifier, a type, or a communications load of the one or more base stations.

56. The apparatus of claim 44, wherein the means for communicating the message to the one or more base stations further receives a disparate message from a wireless terminal co-located at the one or more base stations.

57. The apparatus of claim 56, wherein the disparate message is a resource allocation request.

58. The apparatus of claim 44, wherein the means for communicating the message to the one or more base stations includes a wireless terminal co-located at the apparatus.

59. The apparatus of claim 58, wherein the one or more interference management messages is a resource allocation request.

60. The apparatus of claim 44, wherein the message comprises a buffer level related to communicating with the one or more wireless terminals.

61. The apparatus of claim 44, wherein the message comprises one or more parameters related to interference from one or more disparate base stations to the apparatus.

62. The apparatus of claim 44, wherein the message comprises a priority assigned to the apparatus.

63. The apparatus of claim 44, wherein the one or more disparate messages comprise a measurement gap indication corresponding to communicating with the one or more base stations, a command to enter a discontinuous receive mode, one or more radio link failure timers, or one or more parameters regarding a time period or time interval when the means for communicating communicates the message to the one or more base stations.

64. The apparatus of claim 44, further comprising means for fading transmission power to the one or more wireless terminals before the means for communicating communicates the message the one or more base stations.

65. The apparatus of claim 44, wherein the link allocated for communications between base stations includes a wired backhaul link.

66. A computer program product, comprising:
a non-transitory computer-readable medium comprising:
code for causing at least one computer to transmit one or more data signals to one or more wireless terminals over an air interface;
code for causing the at least one computer to communicate with one or more base stations over a link allocated for communications between base stations; and
code for causing the at least one computer to communicate a message comprising blanking information with the one or more base stations over the air interface when the link is unreliable for communicating with the one or more base stations, wherein the blanking information is used to establish a distributed resource allocation for communicating with the one or more wireless terminals.

67. The computer program product of claim 66, wherein the message comprises one or more interference management messages.

68. The computer program product of claim 67, wherein the one or more interference management messages includes a blanking request.

69. The computer program product of claim 67, wherein the one or more interference management messages includes an indication of a set of resources blanked by the one or more base stations.

70. The computer program product of claim 67, wherein the nontransitory computer-readable medium further comprises code for causing the at least one computer to determine to exchange the one or more interference management messages with the one or more base stations based at least in part on one or more parameters related to the one or more base stations.

71. The computer program product of claim 67, wherein the nontransitory computer-readable medium further comprises code for causing the at least one computer to blank transmission over a set of blanked resources based at least in part on the one or more interference management messages.

72. The computer program product of claim 71, wherein the nontransitory computer-readable medium further comprises code for causing the at least one computer to communicate an indication of the set of blanked resources to the one or more base stations.

73. The computer program product of claim 72, wherein the one or more interference management messages includes a buffer level of a disparate wireless terminal communicating with the one or more base stations, an assigned priority of the one or more base stations, or one or more interference parameters related to the one or more base stations, and the non-transitory computer-readable medium further comprises code for causing the at least one computer to determine the set of blanked resources based at least in part on the buffer level of the disparate wireless terminal, the assigned priority of the one or more base stations, or the one or more interference parameters.

74. The computer program product of claim 73, wherein the nontransitory computer-readable medium further comprises code for causing the at least one computer to determine a disparate set of blanked resources for blanking for one or more disparate base stations based at least in part on the buffer level of the disparate wireless terminal, the assigned priority of the one or more base stations, or the one or more interference parameters.

75. The computer program product of claim 66, wherein the code for causing the at least one computer to communicate with the one or more base stations communicates with a co-located wireless terminal of the one or more base stations.

76. The computer program product of claim 75, wherein the nontransitory computer-readable medium further comprises code for causing the at least one computer to receive a resource allocation request from the co-located wireless terminal.

77. The computer program product of claim 66, wherein the code for causing the at least one computer to communicate with the one or more base stations communicates with the one or more base stations using a wireless terminal co-located.

78. The computer program product of claim 77, wherein the message is a resource allocation request.

79. The computer program product of claim 66, wherein the message includes a buffer level related to the one or more wireless terminals, an assigned priority relative to the one or more base stations, or one or more parameters relating to interference from one or more disparate base stations.

80. The computer program product of claim 66, wherein the one or more data signals includes a measurement gap related to communicating with the one or more base stations, a command to enter a discontinuous receive mode over one or more time periods during which the code for causing the at least one computer to communicate communicates the message with the one or more base stations, one or more radio link failure timers, or one or more parameters regarding a time period or time interval during which the code for causing the at least one computer to communicate communicates the message with the one or more base stations.

81. The computer program product of claim 66, wherein the nontransitory computer-readable medium further comprises code for causing the at least one computer to fade transmission power for transmitting the one or more data signals to the one or more wireless terminals over a period of time before communicating with the one or more base stations.

82. The computer program product of claim 66, wherein the link allocated for communications between base stations includes a wired backhaul link.

83. An apparatus, comprising:
a communicating component that communicates with one or more base stations over a link allocated for communications between base stations;
an inter-access point message generating component that creates a message comprising blanking information for one or more base stations, wherein the blanking information is used to establish a distributed resource allocation for communicating with one or more wireless terminals; and
an air interface communicating component that communicates the message to the one or more base stations over an air interface when the link is unreliable for communicating with the one or more base stations and communicates one or more disparate messages to the one or more wireless terminals over the air interface.

84. The apparatus of claim 83, wherein the message includes one or more interference management messages.

85. The apparatus of claim 84, wherein the one or more interference management messages comprise a request for blanking or an indication of a set of resources blanked by the one or more base stations.

86. The apparatus of claim 84, further comprising a parameter measuring component that determines to communicate the one or more interference management messages to the one or more base stations based at least in part on one or more parameters related to the one or more base stations and one or more similar parameters related to the apparatus.

87. The apparatus of claim 86, wherein the one or more parameters related to the one or more base stations include an identifier of the one or more base stations, an assigned priority of the one or more base stations, a type of the one or more base stations, or a communications load on the one or more base stations, and the one or more interference management messages include a request for a resource allocation.

88. The apparatus of claim 84, wherein the air interface communicating component further receives a blanking request from the one or more base stations over the air interface.

89. The apparatus of claim 84, wherein the air interface communicating component blanks transmission over a set of blanked resources based at least in part on one or more disparate interference management messages received from the one or more base stations.

90. The apparatus of claim 89, further comprising a resource scheduling component that generates an indication of the set of blanked resources in response to the one or more disparate interference management messages, wherein the one or more interference management messages includes the indication of the set of blanked resources.

91. The apparatus of claim 90, further comprising a resource allocating component that determines the set of blanked resources based at least in part on a buffer level of a disparate wireless terminal, an assigned priority of the one or more base stations, or one or more parameters related to interference at the one or more base stations, wherein the one or more disparate interference management messages received from the one or more base stations includes the buffer level of the disparate wireless terminal, the assigned priority of the one or more base stations, or the one or more parameters related to the interference at the one or more base stations.

92. The apparatus of claim 84, wherein the one or more interference management messages comprises an identifier, a type, an assigned priority, or a communications load of the one or more base stations.

93. The apparatus of claim 83, wherein the au interface communicating component further receives a disparate message from a wireless terminal co located at the one or more base stations.

94. The apparatus of claim 83, wherein the air interface communicating component is included within a wireless terminal co-located at the apparatus.

95. The apparatus of claim 83, wherein the message comprises a buffer level related to communicating with the one or more wireless terminals.

96. The apparatus of claim 83, wherein the message comprises one or more parameters related to interference from one or more disparate base stations to the apparatus.

97. The apparatus of claim 83, wherein the message comprises a priority assigned to the apparatus.

98. The apparatus of claim 83, wherein the one or more disparate messages comprise a measurement gap indication corresponding to communicating with the one or more base stations, a command to enter a discontinuous receive mode, one or more radio link failure timers, or one or more parameters regarding a time period or time interval when the air interface communicating component communicates the message to the one or more base stations.

99. The apparatus of claim 83, further comprising a power fading component that decreases transmission power to the one or more wireless terminals over a period of time before the air interface communicating component communicates the message the one or more base stations.

100. The apparatus of claim 83, wherein the link allocated for communications between base stations includes a wired backhaul link.

* * * * *